US011180889B2

(12) United States Patent
Behabtu et al.

(10) Patent No.: US 11,180,889 B2
(45) Date of Patent: Nov. 23, 2021

(54) PROCESSES FOR PRODUCING PRECIPITATED CALCIUM CARBONATE USING POLYSACCHARIDES

(71) Applicant: NUTRITION & BIOSCIENCES USA 4, INC., Rochester, NY (US)

(72) Inventors: Natnael Behabtu, Wilmington, DE (US); Sandeep Mora, Cambridge, MA (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 50 days.

(21) Appl. No.: 16/474,812

(22) PCT Filed: Jan. 23, 2018

(86) PCT No.: PCT/US2018/014832
§ 371 (c)(1),
(2) Date: Jun. 28, 2019

(87) PCT Pub. No.: WO2018/140392
PCT Pub. Date: Aug. 2, 2018

(65) Prior Publication Data
US 2019/0330802 A1 Oct. 31, 2019

Related U.S. Application Data

(60) Provisional application No. 62/449,638, filed on Jan. 24, 2017.

(51) Int. Cl.
*D21H 17/67* (2006.01)
*C01F 11/18* (2006.01)
*D21H 17/24* (2006.01)

(52) U.S. Cl.
CPC ......... *D21H 17/675* (2013.01); *C01F 11/183* (2013.01); *D21H 17/24* (2013.01); *C01P 2004/03* (2013.01)

(58) Field of Classification Search
None
See application file for complete search history.

(56) References Cited

U.S. PATENT DOCUMENTS 5,643,415 A    7/1997   Wise
6,221,146 B1 *   4/2001   Fortier .................. C01F 11/181
                                                                                 106/465

(Continued)

FOREIGN PATENT DOCUMENTS

WO           9951691 A1    10/1999
WO    WO-9951691 A1 * 10/1999          C01F 11/183

(Continued)

OTHER PUBLICATIONS

Ciobanu et al, Cellulose Chem. Technol., 44 (9), 379-387 (2010).
International Preliminary Report on Patentability dated Jul. 30, 2019 for PCT/US18/14832.

*Primary Examiner* — Dennis R Cordray

(57) ABSTRACT

Disclosed herein are processes for producing precipitated calcium carbonate. In one embodiment, the process comprises the steps of a) providing an aqueous slurry of calcium hydroxide; b) adding a polysaccharide to the slurry of calcium hydroxide; and c) carbonating the slurry of calcium hydroxide. The polysaccharide comprises poly alpha-1,3-glucan, a poly alpha-1,3-glucan ester compound as disclosed herein, or a poly alpha-1,3-glucan ether compound as disclosed herein. The precipitated calcium carbonate produced by the process can be useful in making paper.

22 Claims, 9 Drawing Sheets

(56) References Cited

U.S. PATENT DOCUMENTS

| | | | |
|---|---|---|---|
| 6,294,143 B1* | 9/2001 | Deutsch | C01F 11/183 |
| | | | 423/165 |
| 7,000,000 B1 | 2/2006 | O'Brien | |
| 8,642,757 B2 | 2/2014 | O'Brien et al. | |
| 9,080,195 B2 | 7/2015 | O'Brien et al. | |
| 9,139,718 B2 | 9/2015 | Paullin et al. | |
| 2013/0244287 A1 | 9/2013 | O'Brien et al. | |
| 2013/0244288 A1 | 9/2013 | O'Brien et al. | |
| 2014/0179913 A1 | 6/2014 | Paullin et al. | |
| 2019/0276326 A1 | 9/2019 | Savary | |

FOREIGN PATENT DOCUMENTS

| | | | |
|---|---|---|---|
| WO | 0058217 A1 | | 10/2000 |
| WO | WO-0058217 A | * | 10/2000 |
| WO | 2015095358 A1 | | 6/2015 |
| WO | 2016196022 A1 | | 12/2016 |
| WO | 2017003808 A1 | | 1/2017 |

* cited by examiner

PROCESSES FOR PRODUCING PRECIPITATED CALCIUM CARBONATE USING POLYSACCHARIDES

CROSS-REFERENCE TO RELATED APPLICATIONS

This application is the National Stage application of International Application No. PCT/US2018/14832 (filed Jan. 23, 2018), which claims priority to and the benefit of U.S. Provisional Application No. 62/449,638, titled (filed Jan. 24, 2017), both of which prior applications are incorporated herein by reference in their entirety.

FIELD OF THE DISCLOSURE

The present disclosure is directed towards processes for producing precipitated calcium carbonate using polysaccharides, and the product compositions obtained from such processes. The compositions are thought to be useful in making paper, adhesives, polymers, paint, and rubber compositions.

BACKGROUND

Precipitated calcium carbonate is obtained commercially by carbonation of calcium hydroxide derived from limestone. Typically, precipitated calcium carbonate is generated in an aqueous slurry which can be at least 90% water by weight. The primary application for precipitated calcium carbonate is in paper. For paper applications, precipitated calcium carbonate can be produced at a paper mill, where the slurry of precipitated calcium carbonate can be used directly, without the need to separate the solid calcium carbonate from the water.

The shape and size of the calcium carbonate particles used in a paper-making process can affect paper qualities, for example brightness. In the chemical conversion of calcium oxide to calcium carbonate, process variables such as temperature and pH can affect the shape, surface area, and particle size distribution of the precipitated calcium carbonate product, as can the addition of additives such as polyphosphate.

There remains a need for improved processes to prepare precipitated calcium carbonate. There remains a need for processes in which the morphology of precipitated calcium carbonate can be selectively adjusted. There remains a need for precipitated calcium carbonate which provides advantages in the paper-making process and improved paper qualities.

SUMMARY

Disclosed herein are processes for producing precipitated calcium carbonate, and the precipitated calcium carbonate produced according to the processes disclosed herein. Also disclosed is paper comprising precipitated calcium carbonate produced according to the processes disclosed herein, and polymer comprising precipitated calcium carbonate produced according to the processes disclosed herein.

In one embodiment, a process is disclosed, the process comprising the steps of:
a) providing an aqueous slurry of calcium hydroxide;
b) adding a polysaccharide to the slurry of calcium hydroxide; and
c) carbonating the slurry of calcium hydroxide.

In one embodiment, step b) is performed before step c). In another embodiment, step b) is performed concurrently with step c). In a further embodiment, step b) is performed in a discontinuous manner.

In one embodiment, the polysaccharide is insoluble in the aqueous slurry of calcium hydroxide. In another embodiment, at least a portion of the polysaccharide is soluble in the slurry of calcium hydroxide. In another embodiment, the polysaccharide is added in an amount of from about 0.1 weight percent to about 80 weight percent, based on the total weight of precipitated calcium carbonate and polysaccharide composite obtained.

In one embodiment, the polysaccharide comprises
i) poly alpha-1,3-glucan;
ii) a poly alpha-1,3-glucan ester compound represented by Structure I:

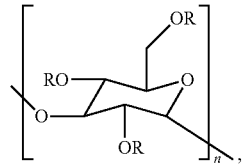

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3;
iii) a poly alpha-1,3-glucan ether compound represented by Structure II:

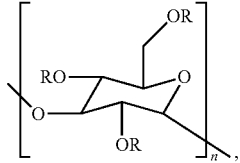

Structure II wherein
(D) n is at least 6,
(E) each R is independently an H or an organic group, and
(F) the ether compound has a degree of substitution (DOS) of about 0.001 to about 3; or
iv) a poly alpha-1,3-glucan ether compound represented by Structure III:

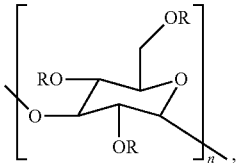

Structure III wherein
- (G) n is at least 6,
- (H) each R is independently an H or a positively charged organic group, and
- (J) the compound has a degree of substitution of about 0.001 to about 3.0.

In one embodiment, the process further comprises a step d) adding an additive to the slurry of calcium hydroxide. In an additional embodiment, step d) is performed before step c), concurrently with step c), or after step c). In a further embodiment, the additive comprises polyphosphate, stearic acid, starch, cellulose, or alkyl ketene dimer. In yet another embodiment, the process further comprises a step of using the precipitated calcium carbonate in a paper-making process.

Also disclosed herein is a process for producing a mixture comprising precipitated calcium carbonate and a polysaccharide, the process comprising the steps of:
- a) providing an aqueous slurry of calcium hydroxide;
- b) carbonating the slurry of calcium hydroxide to produce a slurry of precipitated calcium carbonate; and
- c) adding a polysaccharide to the slurry of precipitated calcium carbonate.

Also disclosed herein is the mixture comprising precipitated calcium carbonate and a polysaccharide produced by the processes disclosed herein. Additionally disclosed herein is paper comprising the mixture comprising precipitated calcium carbonate and a polysaccharide produced according to the processes disclosed herein, as well as polymer comprising the mixture produced according to the processes disclosed herein.

BRIEF DESCRIPTION OF THE FIGURES

The disclosure is illustrated by way of example and not limited to the accompanying figures.

DETAILED DESCRIPTION

Figure 1:
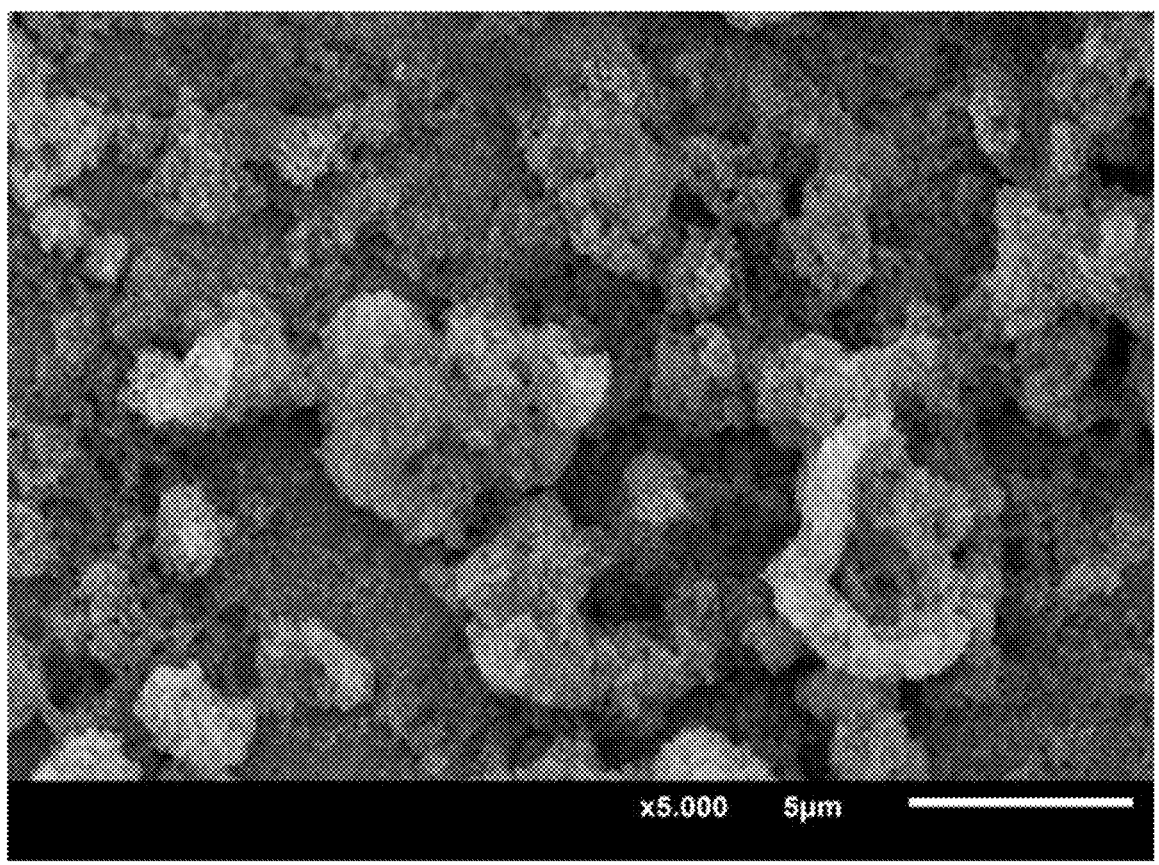
FIG. 1 is a reproduction of a scanning electron microscopy image of the precipitated product obtained in Comparative Example D.

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "polysaccharide" means a polymeric carbohydrate molecule composed of long chains of monosaccharide units bound together by glycosidic linkages and on hydrolysis give the constituent monosaccharides or oligosaccharides.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 5 grams of the substance, for example, poly alpha-1,3-glucan, dissolves in 100 milliliters of water at 23° C. In other embodiments, water insoluble means that less than 4 grams or 3 grams or 2 grams or 1 grams of the substance is dissolved in water at 23° C.

The term "water soluble" or "water dispersible" refers to the polysaccharide or the polysaccharide derivative that is soluble at 1% by weight or higher in pH 7 water at 25° C. The percentage by weight is based on the total weight of the polysaccharide soluble in water, for example, 1 gram of polysaccharide in 100 grams of water.

The term "slurry" refers to a mixture of solid and liquid.

As used herein, the term "colloidal dispersion" refers to a heterogeneous system having a dispersed phase and a dispersion medium, i.e., microscopically dispersed insoluble particles are suspended throughout another substance. An example of a colloidal dispersion in water is a hydrocolloid. The colloidal dispersion may be a stable colloidal dispersion or an unstable colloidal dispersion. The stable colloidal dispersion is stable at room temperature and/or at elevated temperature, for example, between 40 and 50° C. for a period of at least one month with no visible settling. The unstable dispersion, under the same conditions, may see at least a portion of the polysaccharide settle out of the dispersion. Agitation of the settled material will generally re-form the colloidal dispersion. In some embodiments, the colloidal dispersion is a stable dispersion. In other embodiments, the colloidal dispersion is an unstable dispersion.

A hydrocolloid refers to a colloid system in which water is the dispersion medium. Therefore, a hydrocolloid herein can also refer to a dispersion, emulsion, mixture, or solution of, for example, poly alpha-1,3-glucan in water or aqueous solution.

As used herein, "weight average molecular weight" or "$M_w$" is calculated as $M_w = \Sigma N_i M_i^2 / \Sigma N_i M_i$; where $M_i$ is the molecular weight of a chain and Ni is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

The present disclosure is directed to processes for producing precipitated calcium carbonate using polysaccharides, and the product compositions (also referred to herein as precipitated calcium carbonate/polysaccharide composites) obtained from such processes. The compositions produced are expected to be useful in making paper and are expected to show improved optical properties (improved opacity) and retention in the paper-making process. It is anticipated that paper comprising the compositions disclosed herein can have improved properties, for example improved strength, sizing, retention, air permeability, and/or brightness. The compositions are also expected to be useful in making adhesives or paint, and could be used as filler in various polymers.

In a first embodiment, the present disclosure is directed to a process for producing precipitated calcium carbonate, the process comprising the steps of:

a) providing an aqueous slurry of calcium hydroxide;
b) adding a polysaccharide to the slurry of calcium hydroxide; and
c) carbonating the slurry of calcium hydroxide.

The present disclosure is also directed to the product composition produced according to a process comprising the steps of:

a) providing an aqueous slurry of calcium hydroxide;
b) adding a polysaccharide to the slurry of calcium hydroxide; and
c) carbonating the slurry of calcium hydroxide.

The product composition of the disclosed process is expected to comprise particles comprising precipitated calcium carbonate and polysaccharide; that is, both precipitated calcium carbonate and polysaccharide will be present within the same particle. It is expected that desired particle size, particle shape, and particle size distribution of the product composition can be obtained through appropriate selection of the polysaccharide and the process conditions employed.

An aqueous slurry of calcium hydroxide can be obtained by combining calcium oxide (CaO, lime) with water.

In one embodiment, step b) adding a polysaccharide to the slurry of calcium hydroxide is performed before step c) carbonating the slurry of calcium hydroxide. In another embodiment, step b) adding a polysaccharide to the slurry of calcium hydroxide is performed concurrently with step c) carbonating the slurry of calcium hydroxide. In yet another embodiment, step b) adding a polysaccharide to the slurry of calcium hydroxide is performed in a discontinuous manner, whether step b) is performed before or concurrently with step c) carbonating the slurry of calcium hydroxide. It is anticipated that the polysaccharide can be added all at once to the calcium hydroxide slurry, added in a batchwise manner, or added continuously.

Various polysaccharides are expected to be useful in the processes disclosed herein. In one embodiment, the polysaccharide comprises an enzymatically-produced polysaccharide. In one embodiment, the polysaccharide is a polymer comprising glucose monomeric units linked together by glycosidic linkages, wherein at least 50% of the glycosidic linkages are alpha-1,3-glycosidic linkages. In another embodiment, the polysaccharide comprises a poly alpha-1, 3-glucan ester compound as disclosed herein below, or a poly alpha-1,3-glucan ether compound as disclosed herein below. Mixtures of polysaccharides, or mixtures of polysaccharides and derivatives of polysaccharides, or mixtures of an enzymatically-produced polysaccharide and a surface-modified derivative of an enzymatically-produced polysaccharide, are expected to be useful in the processes disclosed herein.

In one embodiment, the enzymatically-produced polysaccharide comprises a nanostructured polysaccharide characterized by a surface area in the range of from about 0.1 m$^2$/g to about 200 m$^2$/g, as determined by the Brunauer-Emmett-Teller (BET) measurement method. For example, the BET surface area can be 0.1, 0.2, 0.3, 0.4, 0.5, 0.6, 0.7, 0.8, 0.9, 1, 2, 3, 4, 5, 6, 7, 8, 9, 10, 15, 20 25, 30 35, 40 45, 50, 55, 60, 65, 70, 75, 80, 85, 90, 95, 100, 110, 120, 130, 140, 150, 160, 170, 180, 190, or 200 (or any value between 0.1 and 200) m$^2$/g.

In one embodiment, suitable polysaccharides comprise:
i) poly alpha-1,3-glucan;
ii) a poly alpha-1,3-glucan ester compound represented by Structure I:

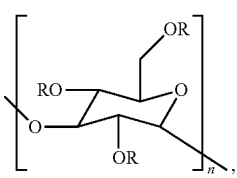

Structure I wherein
(A) n is at least 6;
(B) each R is independently an —H or a first group comprising —CO—C$_x$—COOH, wherein the —C$_x$— portion of said first group comprises a chain of 2 to 6 carbon atoms; and
(C) the compound has a degree of substitution with the first group of about 0.001 to about 3;
iii) a poly alpha-1,3-glucan ether compound represented by Structure II:

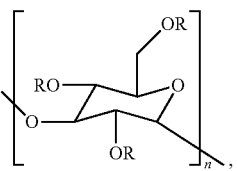

Structure II wherein
(D) n is at least 6,
(E) each R is independently an H or an organic group, and
(F) the ether compound has a degree of substitution (DOS) of about 0.001 to about 3; or
iv) a poly alpha-1,3-glucan ether compound represented by Structure III:

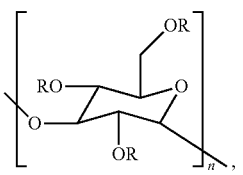

Structure III wherein
(G) n is at least 6,
(H) each R is independently an H or a positively charged organic group, and (J) the compound has a degree of substitution of about 0.001 to about 3.0.

In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

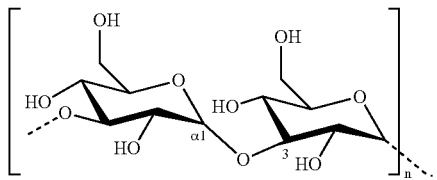

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In another embodiment, the polysaccharide comprises a composition comprising a poly alpha-1,3-glucan ester compound represented by Structure I:

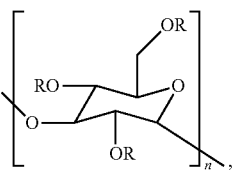

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the ester compound has a degree of substitution with the first group of about 0.001 to about 3.

Such poly alpha-1,3-glucan esters and their preparation are disclosed in published patent application WO 2017/003808, the disclosure of which is incorporated herein in its entirety.

The terms "poly alpha-1,3-glucan ester compound", "poly alpha-1,3-glucan ester", "poly alpha-1,3-glucan ester derivative", and "glucan ester" are used interchangeably herein.

A poly alpha-1,3-glucan ester compound of Structure I is termed an "ester" herein by virtue of comprising the substructure —$C_G$—O—CO—$C_x$—, where "—$C_G$—" represents carbon 2, 4, or 6 of a glucose monomeric unit of a poly alpha-1,3-glucan ester compound, and where "—CO—$C_x$—" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds.

The terms "poly alpha-1,3-glucan monoester" and "monoester" are used interchangeably herein. A poly alpha-1,3-glucan monoester contains one type of first group.

The terms "poly alpha-1,3-glucan mixed ester" and "mixed ester" are used interchangeably herein. A poly alpha-1,3-glucan mixed ester contains two or more types of a first group.

The terms "reaction", "esterification reaction", "reaction composition", and "reaction preparation" are used interchangeably herein and refer to a reaction comprising, or consisting of, poly alpha-1,3-glucan and at least one cyclic organic anhydride. A reaction is placed under suitable conditions (e.g., time, temperature, pH) for esterification of one or more hydroxyl groups of the glucose units of poly alpha-1,3-glucan with a first group provided by the cyclic organic anhydride, thereby yielding a poly alpha-1,3-glucan ester compound.

The terms "cyclic organic anhydride", "cyclic organic acid anhydride", and "cyclic acid anhydride" are used interchangeably herein. A cyclic organic anhydride herein can have a formula represented by Structure A shown below:

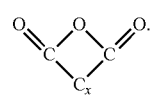

Structure A

The —$C_x$— portion of Structure A typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

Each R group in the formula of a poly alpha-1,3-glucan ester compound represented by Structure I can independently be an —H or a first group comprising —CO—$C_x$—COOH. The —$C_x$— portion of the first group typically comprise a chain of 2 to 6 carbon atoms; each of these carbon atoms is preferably involved in four covalent bonds. In general, each carbon in the chain, aside from being covalently bonded with an adjacent carbon atom(s) in the chain or a carbon atom of the flanking C═O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH═CH—), and/or be bonded to a hydrogen and an organic group (i.e., one hydrogen is substituted with an organic group). Skilled artisans would understand how the carbon atoms of the —$C_x$— portion of a first group comprising —CO—C$_x$—COOH can typically be bonded, given that carbon has a valency of four. It is contemplated that, in some embodiments, the —C$_x$— portion of the first group can comprise a chain of 2 to 16, 2 to 17, or 2 to 18 carbon atoms.

In certain embodiments of the present disclosure, the —C$_x$— portion of the first group (—CO—C$_x$—COOH) comprises only CH$_2$ groups. Examples of a first group in which the —C$_x$— portion comprises only CH$_2$ groups are —CO—CH$_2$—CH$_2$—COOH, —CO—CH$_2$—CH$_2$—CH$_2$—COOH, —CO—CH$_2$—CH$_2$—CH$_2$—CH$_2$—COOH, —CO—CH$_2$—CH$_2$—CH$_2$CH$_2$—CH$_2$—COOH, and —CO—CH$_2$—CH$_2$—CH$_2$—CH$_2$—CH$_2$—CH$_2$—COOH. These first groups can be derived, respectively, by reacting succinic anhydride, glutaric anhydride, adipic anhydride, pimelic anhydride, or suberic anhydride with poly alpha-1,3-glucan.

The —C$_x$— portion of the first group (—CO—C$_x$—COOH) in some aspects can comprise (i) at least one double-bond in the carbon atom chain, and/or (ii) at least one branch comprising an organic group. For instance, the —C$_x$— portion of the first group can have at least one double-bond in the carbon atom chain. Examples of a first group in which the —C$_x$— portion comprises a carbon-carbon double-bond include —CO—CH=CH—COOH, —CO—CH=CH—CH$_2$—COOH, —CO—CH=CH—CH$_2$—CH$_2$—COOH, —CO—CH=CH—CH$_2$—CH$_2$—CH$_2$—COOH, —CO—CH=CH—CH$_2$—CH$_2$—CH$_2$—CH$_2$—COOH, —CO—CH$_2$—CH=CH—COOH, —CO—CH$_2$—CH=CH—CH$_2$—COOH, —CO—CH$_2$—CH=CH—CH$_2$—CH$_2$—COOH, —CO—CH$_2$—CH=CH—CH$_2$—CH$_2$—CH$_2$—COOH, —CO—CH$_2$—CH$_2$—CH=CH—COOH, —CO—CH$_2$—CH$_2$—CH=CH—CH$_2$—COOH, —CO—CH$_2$—CH$_2$—CH=CH—CH$_2$—CH$_2$—COOH, —CO—CH$_2$—CH$_2$—CH$_2$—CH=CH—COOH, —CO—CH$_2$—CH$_2$—CH$_2$—CH=CH—CH$_2$—COOH, and —CO—CH$_2$—CH$_2$—CH$_2$—CH$_2$—CH=CH—COOH. Each of these first groups can be derived by reacting the appropriate cyclic organic anhydride with poly alpha-1,3-glucan. For example, to produce a first group comprising —CO—CH=CH—COOH, maleic anhydride can be reacted with poly alpha-1,3-glucan. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO-] together to form a cycle) can be reacted with poly alpha-1,3-glucan to produce an ester thereof having the corresponding first group (—CO—C$_x$—COOH).

The —C$_x$— portion of the first group (—CO—C$_x$—COOH) in some aspects herein can comprise at least one branch comprising an organic group. Examples of a first group in which the —C$_x$— portion comprises at least one organic group branch include:

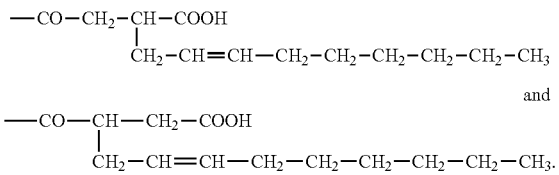

and

Each of these two first groups can be derived by reacting 2-nonen-1-yl succinic anhydride with poly alpha-1,3-glucan. It can be seen that the organic group branch (generically termed "R$^b$" herein) in both these examples is —CH$_2$—CH=CH—CH$_2$—CH$_2$—CH$_2$—CH$_2$—CH$_2$—CH$_3$. It can also be seen that the R$^b$ group substitutes for a hydrogen in the —C$_x$— carbon chain.

Thus, for example, a first group (—CO—C$_x$—COOH) herein can be any of —CO—CH$_2$—CH$_2$—COOH, —CO—CH$_2$—CH$_2$—CH$_2$—COOH, —CO—CH$_2$—CH$_2$—CH$_2$—CH$_2$—COOH, —CO—CH$_2$—CH$_2$—CH$_2$—CH$_2$—CH$_2$—COOH, or —CO—CH$_2$—CH$_2$—CH$_2$—CH$_2$—CH$_2$—CH$_2$—COOH, but in which at least one, two, three, or more hydrogens thereof is/are substituted with an R$^b$ group. Also for example, a first group (—CO—C$_x$—COOH) herein can be any of —CO—CH=CH—CH$_2$—COOH, —CO—CH=CH—CH$_2$—CH$_2$—COOH, —CO—CH=CH—CH$_2$—CH$_2$—CH$_2$—COOH, —CO—CH=CH—CH$_2$—CH$_2$—CH$_2$—CH$_2$—COOH, —CO—CH$_2$—CH=CH—COOH, —CO—CH$_2$—CH=CH—CH$_2$—COOH, —CO—CH$_2$—CH=CH—CH$_2$—CH$_2$—COOH, —CO—CH$_2$—CH=CH—CH$_2$—CH$_2$—CH$_2$—COOH, —CO—CH$_2$—CH$_2$—CH=CH—COOH, —CO—CH$_2$—CH$_2$—CH=CH—CH$_2$—COOH, —CO—CH$_2$—CH$_2$—CH=CH—CH$_2$—CH$_2$—COOH, —CO—CH$_2$CH$_2$—CH$_2$—CH=CH—COOH, —CO—CH$_2$—CH$_2$—CH$_2$—CH=CH—CH$_2$—COOH, or —CO—CH$_2$—CH$_2$—CH$_2$—CH$_2$—CH=CH—COOH, but in which at least one, two, three, or more hydrogens thereof is/are substituted with an R$^b$ group (such first groups are examples in which the —C$_x$— portion comprises at least one double-bond in the carbon atom chain and at least one branch comprising an organic group). Suitable examples of R$^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure A and its involvement in the esterification process to prepare poly alpha-1,3-glucan esters of Structure I herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure I include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-yl succinic anhydride. Alkenyl succinic anhydrides and alkylketene dimers, for example those derived from palmitic acid or other long chain carboxylic acids, can also be used. In particular, for example, maleic anhydride can be used to esterify —CO—CH=CH—COOH as a first group to poly alpha-1,3-glucan; methylsuccinic anhydride can be used to esterify —CO—CH$_2$—CH(CH$_3$)—COOH and/or —CO—CH(CH$_3$)—CH$_2$—COOH as a first group to poly alpha-1,3-glucan; methylmaleic anhydride can be used to esterify —CO—CH=C(CH$_3$)—COOH and/or —CO—C(CH$_3$)=CH—COOH as a first group to poly alpha-1,3-glucan; dimethylmaleic anhydride can be used to esterify —CO—C(CH$_3$)=C(CH$_3$)—COOH as a first group to poly alpha-1,3-glucan; 2-ethyl-3-methylmaleic anhydride can be used to esterify —CO—C(CH$_2$CH$_3$)=C(CH$_3$)—COOH and/or —CO—C(CH$_3$)=C(CH$_2$CH$_3$)—COOH as a first group to poly alpha-1,3-glucan; 2-hexyl-3-methylmaleic anhydride can be used to esterify —CO—C(CH$_2$CH$_2$CH$_2$CH$_2$CH$_2$CH$_3$)=C(CH$_3$)—COOH and/or —CO—C(CH$_3$)=C(CH$_2$CH$_2$CH$_2$CH$_2$CH$_2$CH$_3$)—COOH as a first group to poly alpha-1,3-glucan; itaconic anhydride can be used to esterify —CO—CH$_2$—C(CH$_2$)—COOH and/or —CO—C(CH$_2$)—CH$_2$—COOH as a first group to poly alpha-1,3-glucan; 2-nonen-1-yl succinic anhydride can be used to esterify —CO—CH$_2$—CH(CH$_2$CH=CHCH$_2$CH$_2$CH$_2$CH$_2$CH$_3$)—COOH and/or —CO—CH(CH$_2$CH=CHCH$_2$CH$_2$CH$_2$CH$_2$CH$_3$)—CH$_2$—COOH as a first group to poly alpha-1,3-glucan.

As disclosed in WO 2017/003808, each of these first groups comprising a —C$_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—CH$_2$—CH(CH$_3$)—COOH or —CO—CH(CH$_3$)—CH$_2$—COOH. Still another illustrative example includes using methylmaleic anhydride to ester-derivatize poly alpha-1,3-glucan, where the resultant first group is —CO—CH=C(CH$_3$)—COOH or —CO—C(CH$_3$)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO-] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate). As another example, one or more R groups ester-linked to the glucose group in the above formula may be —CO—CH=CH—COOH; the R groups in this particular example would thus independently be hydrogen and —CO—CH=CH—COOH groups (such an ester compound can be referred to as poly alpha-1,3-glucan maleate).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO—) groups in aqueous conditions. These anionic groups can interact with salt cations such as potassium, sodium, or lithium cations, if present.

In one embodiment, a poly alpha-1,3-glucan ester compound represented by Structure I as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure I comprises poly alpha-1,3-glucan succinate.

The term "degree of substitution" (DOS) as used herein refers to the average number of hydroxyl groups substituted in each monomeric unit (glucose) of a derivatized poly alpha-1,3-glucan compound. Poly alpha-1,3-glucan ester compounds useful in the processes disclosed herein have a degree of substitution (DOS) with one or more first groups (—CO—C$_x$—COOH) of about 0.001 to about 3. In one embodiment, it is believed that the DoS of the poly alpha-1,3-glucan ester compound can be about 0.001, 0.005, 0.01, 0.02, 0.02, 0.03, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2 (or any value between 0.001 and 0.2). Alternatively still, it is believed that the DoS can be at least about 0.2, for example 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.3, 2.3, 2.4, 2.5, 2.6, 2.7, 2.8, 2.9, or 3.0. The DoS can optionally be expressed as a range between any two of these values. It would be understood by those skilled in the art that, since a poly alpha-1,3-glucan ester compound herein has a degree of substitution between about 0.001 to about 3, the R groups of the compound cannot only be hydrogen.

A poly alpha-1,3-glucan ester compound herein can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the DPw (weight average degree of polymerization) or DPn (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

In another embodiment, the polysaccharide comprises a composition comprising a poly alpha-1,3-glucan ether compound represented by Structure II:

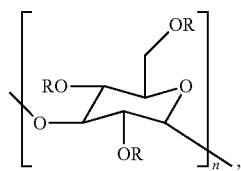

Structure II wherein
(D) n is at least 6,
(E) each R is independently an H or an organic group, and
(F) the ether compound has a degree of substitution (DOS) of about 0.001 to about 3. Compositions comprising a poly alpha-1,3-glucan ether compound represented by Structure II and having a DoS of about 0.05 to about 3 are disclosed in U.S. Pat. No. 9,139,718 B2, the entire disclosure of which is hereby incorporated in its entirety. Poly alpha-1,3-glucan ether compounds represented by Structure II and having DoS of about 0.001 to about 0.2, or about 0.2 to about 3, can be prepared by adjusting the ratio of glucan and etherification agent.

The term "organic group" refers to a chain of one or more carbons that (i) has the formula —$C_nH_{2n+1}$ (i.e., an alkyl group, which is completely saturated) or (ii) is mostly saturated but has one or more hydrogens substituted with another atom or functional group (i.e., a "substituted alkyl group"). Such substitution may be with one or more hydroxyl groups, oxygen atoms (thereby forming an aldehyde or ketone group), carboxyl groups, or other alkyl groups. The organic group can be a hydroxy alkyl group, alkyl group, or carboxy alkyl group. A "hydroxy alkyl" group herein refers to a substituted alkyl group in which one or more hydrogen atoms of the alkyl group are substituted with a hydroxyl group. A "carboxy alkyl" group herein refers to a substituted alkyl group in which one or more hydrogen atoms of the alkyl group are substituted with a carboxyl group. The ether compound may contain one type of the organic group, or two or more types of the organic group. The organic group may be a hydroxypropyl (e.g., —$CH_2CH_2CH_2OH$, —$CH_2CH(OH)CH_3$, —$CH(OH)CH_2CH_3$), dihydroxypropyl, hydroxyethyl (e.g., —$CH_2CH_2OH$, —$CH(OH)CH_3$), dihydroxyethyl, hydroxymethyl (—$CH_2OH$), hydroxybutyl, dihydroxybutyl, hydroxypentyl, dihydroxypentyl, methyl, ethyl, carboxymethyl (—$CH_2COOH$), carboxyethyl (e.g., —$CH_2CH_2COOH$, —$CH(COOH)CH_3$), carboxypropyl (e.g., —$CH_2CH_2CH_2COOH$, —$CH_2CH(COOH)CH_3$, —$CH(COOH)CH_2CH_3$), carboxybutyl, or carboxypentyl group, for example. In one embodiment, the organic group is a carboxymethyl group and the DoS is from about 0.001 to about 0.2. In another embodiment, the organic group is a carboxymethyl group and the DoS is from about 0.05 to about 0.1. In yet another embodiment, the organic group is a carboxymethyl group and the DoS is from about 0.2 to about 3.

In a further embodiment, the polysaccharide comprises a composition comprising a poly alpha-1,3-glucan ether compound represented by Structure III:

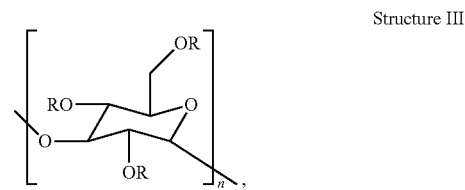

Structure III wherein
(i) n is at least 6,
(ii) each R is independently an H or a positively charged organic group, and
iii) the compound has a degree of substitution of about 0.001 to about 3.0. Compositions comprising a poly alpha-1,3-glucan ether compound represented by Structure III and having a DoS of about 0.05 to about 3 are disclosed in published patent application WO 2015/095358, the entire disclosure of which is hereby incorporated in its entirety. Poly alpha-1,3-glucan ether compounds represented by Structure III and having a DoS of about 0.001 to about 3 can be prepared as described in WO 2015/095358, with the ratio of glucan and etherification agent adjusted to achieve the desired DoS value, as would be understood by one of ordinary skill in the art.

Each R group in Structure III can independently be an H or a positively charged organic group. As defined herein, a positively charged organic group comprises a chain of one or more carbons having one or more hydrogens substituted with another atom or functional group, where one or more of the substitutions is with a positively charged group. In one embodiment, at least one positively charged organic group comprises a substituted ammonium group. In another embodiment, at least one positively charged organic group comprises a trimethylammonium group. In one embodiment, the positively charged organic group can be a quaternary ammonium group. In yet another embodiment, at least one positively charged organic group comprises an alkyl group or hydroxy alkyl group. The compound in this embodiment may contain one type of positively charged organic group, or two or more types of positively charged organic group. At least one positively charged organic group can be a quaternary ammonium hydroxypropyl group, for example.

A "quaternary ammonium poly alpha-1,3-glucan ether compound" herein can comprise a positively charged organic group having a trialkylammonium group, for example. An example of a quaternary ammonium poly alpha-1,3-glucan ether compound can be represented in shorthand as trialkylammonium poly alpha-1,3-glucan ether (e.g., trimethyl-, triethyl-, tripropyl-, tributyl-, tripentyl-, trihexyl-, triheptyl-, trioctyl-, trinonyl- or tridecyl-ammonium poly alpha-1,3-glucan ether). It would be understood that a fourth member implied by the term "quaternary" is the chain of one or more carbons of the positively charged organic group that is ether-linked to a glucose monomer of poly alpha-1,3-glucan.

Substituted ammonium groups can be primary, secondary, tertiary and quaternary ammonium groups. The terms "substituted ammonium group" and "substituted ammonium cation" are used interchangeably herein. A substituted ammonium group herein comprises Structure B:

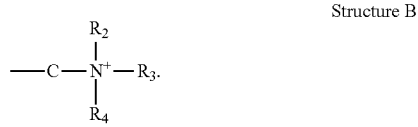

Structure B $R_2$, $R_3$ and $R_4$ in Structure B each independently represent a hydrogen atom or an alkyl, aryl, cycloalkyl, aralkyl, or alkaryl group. The carbon atom (C) in Structure B is part of the chain of one or more carbons ("carbon chain") of the positively charged organic group. The carbon atom is either directly ether-linked to a glucose monomer of poly alpha-1,3-glucan, or is part of a chain of two or more carbon atoms ether-linked to a glucose monomer of poly alpha-1,3-glucan. The carbon atom in Structure B can be —$CH_2$—, —CH— (where a H is substituted with another group such as a hydroxy group), or —C— (where both H's are substituted).

The nitrogen atom in a substituted ammonium group represented by Structure B is bonded to a chain of one or more carbons as comprised in a positively charged organic group. This chain of one or more carbons ("carbon chain") is ether-linked to a glucose monomer of poly alpha-1,3-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain herein.

Examples of a carbon chain of a positively charged organic group that do not have a substitution in addition to the substitution with a positively charged group include —$CH_2$—, —$CH_2CH_2$—, —$CH_2CH_2CH_2$—, —$CH_2CH_2CH_2CH_2$— and —$CH_2CH_2CH_2CH_2CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure B.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH)$CH_2CH_2$— and —CH(OH)$CH_2$CH(OH)$CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure B.

Poly alpha-1,3-glucan ether compounds represented by Structure III may contain one type of positively charged organic group as an R group. For example, one or more positively charged organic groups ether-linked to the glucose monomer of poly alpha-1,3-glucan may be trimethylammonium hydroxypropyl groups; the R groups in this particular example would thus independently be hydrogen and trimethylammonium hydroxypropyl groups. Alternatively, poly alpha-1,3-glucan ether compounds disclosed herein can contain two or more different types of positively charged organic groups as R groups.

In one embodiment the polysaccharide comprises a poly alpha-1,3-glucan ether compound wherein at least one positively charged organic group comprises a substituted ammonium group. In one embodiment, the positively charged organic group comprises a trimethylammonium group. In another embodiment, the positively charged organic group is a quaternary ammonium group. In a further embodiment, at least one positively charged organic group comprises an alkyl group or hydroxy alkyl group. In yet another embodiment, at least one positively charged organic group is a quaternary ammonium hydroxypropyl group.

The degree of substitution (DOS) of a poly alpha-1,3-glucan ether compound represented by Structure III can be in the range of from about 0.001 to about 3.0. Alternatively, the DoS can be in the range of from about 0.05 to about 3.0, or from about 0.001 to about 0.3, or from about 0.2 to about 3.0. Alternatively still, the DoS can be about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 (or any value between 0.001 and 3). It would be understood by those skilled in the art that since a poly alpha-1,3-glucan ether compound herein has a degree of substitution between about 0.001 to about 3.0, and by virtue of being an ether, the R groups of the compound cannot only be hydrogen.

In one embodiment of the process, the polysaccharide is insoluble in the aqueous slurry of calcium hydroxide. It is expected that in adding a polysaccharide which is insoluble in the calcium hydroxide slurry, the polysaccharide will serve as a nucleating agent for the precipitation of calcium carbonate, which will occur when the carbonating step is initiated. It is believed that the use of a polysaccharide insoluble in the aqueous slurry of calcium hydroxide will enable formation of particles comprising precipitated calcium carbonate and polysaccharide, that is, both precipitated calcium carbonate and polysaccharide within the same particle produced in the process. It is anticipated that the product particle could have a core/shell structure, in which the core (inner section) contains polysaccharide and the shell (outer section) contains precipitated calcium carbonate. Appropriate selection of the size and shape of the polysaccharide, in conjunction with appropriate selection of process conditions, is believed to enable production of product particles comprising precipitated calcium carbonate and polysaccharide and having the shape and size desired. It is believed that poly alpha-1,3-glucan will be insoluble in the aqueous slurry of calcium hydroxide. It is believed that the poly alpha-1,3-glucan ester and the poly alpha-1,3-glucan ether compounds disclosed herein above, in which the DoS is in the range of from about 0.001 to about 0.2, will be insoluble in the aqueous slurry of calcium hydroxide under certain reaction conditions.

In another embodiment of the process, at least a portion of the polysaccharide is soluble in the aqueous slurry of calcium hydroxide. It is expected that in adding a polysaccharide of which at least a portion is soluble in the calcium hydroxide slurry, the polysaccharide will co-precipitate with the calcium carbonate precipitating during the carbonating step. It is believed that the use of a polysaccharide of which at least a portion is soluble in the aqueous slurry of calcium hydroxide will enable formation of particles comprising precipitated calcium carbonate and co-precipitated polysaccharide, that is, both precipitated calcium carbonate and co-precipitated polysaccharide within the same particle produced in the process. It is anticipated that the product particle could have a conglomerate structure, in which regions of precipitated calcium carbonate and regions of co-precipitated polysaccharide are dispersed in one another (for example, as islands in a sea), or are located adjacent to each other within the same particle (for example, side-by-side). It is believed that the poly alpha-1,3-glucan ester and the poly alpha-1,3-glucan ether compounds disclosed herein above, in which the DoS is in the range of from about 0.2 to about 3, could have some solubility in the aqueous slurry of calcium hydroxide under certain reaction conditions. The actual DoS value of and the particular substituents on the glucan ester or glucan ether are expected to influence the solubility of the polysaccharide in the slurry.

In one embodiment, in the case where a polysaccharide is added and at least a portion of the polysaccharide is soluble in the calcium hydroxide slurry, it is expected that the product composition could comprise two types of product particles. A first type of product particle could have a core/shell structure, in which the core (inner section) contains polysaccharide and the shell (outer section) contains precipitated calcium carbonate. The first type of product particle is expected to result from the portion of the polysaccharide which is insoluble in the slurry of calcium hydroxide. A second type of product particle could have a conglomerate structure, in which regions of precipitated calcium carbonate and regions of co-precipitated polysaccharide are dispersed in one another. The second type of product particle is expected to result from the portion of the polysaccharide which is soluble in the slurry of calcium hydroxide.

In one embodiment, the product obtained by a process comprising the steps of:

a) providing an aqueous slurry of calcium hydroxide;

b) adding a polysaccharide to the slurry of calcium hydroxide; and c) carbonating the slurry of calcium hydroxide is a product composition comprising particles comprising precipitated calcium carbonate and polysaccharide. In one embodiment, the product composition is expected to comprise particles comprising precipitated calcium carbonate and poly alpha-1,3-glucan. In one embodiment, the product composition is believed to comprise particles comprising precipitated calcium carbonate and a poly alpha-1,3-glucan ester compound represented by Structure I herein. In one embodiment, the product composition in anticipated to comprise particles comprising precipitated calcium carbonate and a poly alpha-1,3-glucan ether compound represented by Structure II herein. In one embodiment, the product composition is expected to comprise particles comprising precipitated calcium carbonate and a poly alpha-1,3-glucan ether compound represented by Structure III herein.

The polysaccharide can be added in an amount of from about 0.1 weight percent to about 80 weight percent, based on the total weight of precipitated calcium carbonate and polysaccharide composite obtained. For example, the polysaccharide can be added in an amount such that the weight percent of the polysaccharide in the precipitated calcium carbonate/polysaccharide composite obtained is about 0.1, 0.2, 0.3, 0.4, 0.5, 0.6, 0.7, 0.8, 0.9, 1, 1.5, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 7, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 (or any value between 0.1 and 80) weight percent, based on the total weight of precipitated calcium carbonate and polysaccharide obtained (theoretical yield based on the amount of calcium hydroxide and polysaccharide used). In one embodiment, the polysaccharide is added in an amount of from about 0.1 weight percent to about 40 weight percent, based on the total weight of the calcium carbonate and polysaccharide in the composite. In another embodiment, the polysaccharide is added in an amount of from about 10 to about 60 weight percent, based on the total weight of the calcium carbonate and polysaccharide in the composite.

The product composition (precipitated calcium carbonate/polysaccharide composite) obtained from the process can contain polysaccharide in an amount of from about 0.1 weight percent to about 80 weight percent, based on the total weight of calcium carbonate and polysaccharide in the product composition.

It is thought that the product composition could comprise particles having an average particle size in at least one dimension of less than about 200 μm.

It is thought that the product composition could comprise particles having a shape which could include rhombohedral, needle-like, cubic, scalenohedral, plate-like, or spherical. Other shapes are thought to be possible as well.

The step of carbonating the slurry of calcium hydroxide will be performed by adding carbon dioxide to the slurry, for example by bubbling the carbon dioxide into or through the liquid phase of the slurry. The carbon dioxide can be used with a diluent, for example air or nitrogen, or without a diluent. The calcium hydroxide reacts with the carbon dioxide to produce calcium carbonate.

Optionally, the process will further comprise a step d) adding an additive to the slurry of calcium hydroxide. Adding an additive could be performed before step c) carbonating the slurry of calcium hydroxide, or adding an additive could be performed concurrently with step c) carbonating the slurry of calcium hydroxide, or adding an additive could be performed after step c) carbonating the slurry of calcium hydroxide.

Useful additives are believed to include polyphosphate, stearic acid, starch, cellulose, or alkyl ketene dimer (also referred to as 2-oxetanone, 3-C12-16-alkyl-4-C13-17-alkylidene derivatives, commercially available from BASF as Basoplast® 88 and Basoplast® 95.

In one embodiment, the process disclosed herein will further comprise a step of using the precipitated calcium carbonate produced according to the process in a papermaking process. The precipitated calcium carbonate produced according to the process is also referred to herein as the product composition. It is believed that the precipitated calcium carbonate produced according to the process disclosed herein will be useful in making paper. It is believed that the precipitated calcium carbonate could be used in making paper as the slurry produced, or optionally isolated and optionally dried, before use in making paper. It is also believed that the precipitated calcium carbonate produced according to the process disclosed herein will be useful as a filler in polymers.

Methods for making paper using calcium carbonate are known in the art.

In a second embodiment, the present disclosure is directed to a process for producing a mixture comprising precipitated calcium carbonate and a polysaccharide, the process comprising the steps of:

a) providing an aqueous slurry of calcium hydroxide;

b) carbonating the slurry of calcium hydroxide to produce a slurry of precipitated calcium carbonate; and c) adding a polysaccharide to the slurry of precipitated calcium carbonate.

The present disclosure is also directed to the mixture comprising precipitated calcium carbonate and a polysaccharide produced according to a process comprising the steps of:

a) providing an aqueous slurry of calcium hydroxide;

b) carbonating the slurry of calcium hydroxide to produce a slurry of precipitated calcium carbonate; and c) adding a polysaccharide to the slurry of precipitated calcium carbonate.

The mixture obtained by the disclosed process is expected to be a physical mixture of particles of precipitated calcium carbonate and particles of polysaccharide. The mixture is expected to result from the polysaccharide being added to the slurry of precipitated calcium carbonate, in contrast to being added to a slurry of calcium hydroxide.

In the process for producing a mixture comprising precipitated calcium carbonate and a polysaccharide, a number of the process steps are expected to be the same as in the process disclosed above, in which the polysaccharide is added before the carbonating step. The slurry of calcium hydroxide will be obtained the same way, the carbonating of the slurry of calcium hydroxide will be performed the same way, and the polysaccharides which are suitable for use in the process are expected to be the same as disclosed herein above, and are expected to be used in the same amounts. The same additives are also expected to be added to the slurry of calcium carbonate, if desired. However, the polysaccharide is to be added after the precipitated calcium carbonate has been produced.

The mixture comprising precipitated calcium carbonate and a polysaccharide is expected to be useful in preparing paper. It is believed that the mixture could be used in making paper as the slurry produced, or optionally isolated and optionally dried, before use in making paper. The mixture is also expected to be useful as a filler in polymers.

Methods for making paper using calcium carbonate are known in the art.

In one embodiment, the mixture comprising precipitated calcium carbonate and a polysaccharide obtained by a process comprising the steps of:

a) providing an aqueous slurry of calcium hydroxide;

b) carbonating the slurry of calcium hydroxide to produce a slurry of precipitated calcium carbonate; and c) adding a polysaccharide to the slurry of precipitated calcium carbonate is a mixture comprising precipitated calcium carbonate particles and polysaccharide particles. In one embodiment, the mixture is believed to comprise precipitated calcium carbonate particles and poly alpha-1,3-glucan particles. In one embodiment, the mixture is expected to comprise precipitated calcium carbonate particles and particles of a poly alpha-1,3-glucan ester compound represented by Structure I herein. In one embodiment, the mixture is believed to comprise precipitated calcium carbonate particles and particles of a poly alpha-1,3-glucan ether compound represented by Structure II herein. In one embodiment, the mixture is anticipated to comprise precipitated calcium carbonate particles and particles of a poly alpha-1,3-glucan ether compound represented by Structure III herein.

In the processes disclosed herein, it is expected that the polysaccharide could be used as a dry powder, for example, containing less than 5% by weight or water, or in other embodiments, the polysaccharide could be used a wet cake, containing greater than 5% by weight of water. In another embodiment, it is believed that the polysaccharide could be used in the form of a colloidal dispersion. In yet another embodiment, it is believed that the polysaccharide could be used in the form of fibrids.

The term "fibrids", as used herein, means nongranular, fibrous or film-like particles with at least one of their three dimensions being of minor magnitude relative to the largest dimension. In some embodiments, the poly alpha-1,3-glucan or poly alpha-1,3-glucan derivative can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000. The terms "fibrids", "poly alpha-1,3-glucan fibrids", "poly alpha-1,3-glucan derivative fibrids", and "fibrillated glucan" are used interchangeably herein.

Fibrids can be prepared by precipitation of a solution of polymeric material such as poly alpha-1,3-glucan or a poly alpha-1,3-glucan derivative using a non-solvent under shear, preferably, high shear, for example as disclosed in published patent application WO 2016/196022, which is incorporated herein by reference in its entirety. The term "non-solvent" as used herein means that it is a poor solvent for the polymeric material, for example, the polymeric material has a solubility of less than 5 wt % in the solvent. In other embodiments, the polymeric material can have a solubility of less than 4, 3, 2, 1 or 0.5 wt % in the solvent. Examples of suitable non-solvents for the poly alpha-1,3-glucan or poly alpha-1,3-glucan derivative include, for example, methanol, ethanol, isopropanol, acetone, aqueous acidic solution, water, etc.

Fibrids can be made by a process comprising:

(a) dissolving poly alpha-1,3-glucan or poly alpha-1,3-glucan derivative in a solvent to make a poly alpha-1,3-glucan or poly alpha-1,3-glucan derivative solution;

(b) precipitating poly alpha-1,3-glucan fibrids or poly alpha-1,3-glucan derivative fibrids under shear to produce a suspension containing the fibrids.

Fibrids can also be made by the addition of a poly alpha-1,3-glucan solution or poly alpha-1,3-glucan derivative solution into a precipitating bath of liquid ("non-solvent"). The addition of the poly alpha-1,3-glucan solution or poly alpha-1,3-glucan derivative solution into the precipitating bath can be accomplished using any standards methods known to those skilled in the art. For example, direct injection can be used.

During the addition, the stream of polymer solution is subjected to shearing forces and turbulence causing the fibrids to precipitate in the form of a suspension by using a non-solvent (i.e., a liquid that has a solubility for the poly alpha-1,3-glucan of less than 5 wt %), in other words, that is immiscible with poly alpha-1,3-glucan or with the poly alpha-1,3-glucan derivative. In some embodiments, the precipitating bath can comprise acid or alkali aqueous solution or alcohol.

It is possible to control (i) the viscosity of the suspension containing fibrids (ii) the size and/or (iii) the shape of the fibrids by controlling one or more process parameters such as, for example, the dope concentration, the type of solvent, the type of mixer, the mixing speed, the pH of precipitation bath, the rate of addition of the solution containing polymer, the amount of non-solvent used, the duration of mixing, the neutralization rate and the concentration of neutralizer.

The term "dope" as used herein refers to solution containing polymer. A dope can be prepared by mixing polymer into a solvent. Thus, as well known to those skilled in the art, dope concentration refers to the amount of polymer mixed into the solvent.

The fibrids can be isolated by filtering the suspension. Optionally, the isolated fibrids can be washed with water and/or dried. It is believed that it is possible to resuspend the dried fibrids either by adding a component such as carboxymethyl cellulose and the like or by functionalizing the fibrids by adding certain groups that would facilitate resuspension in a liquid.

Types of solvent for the poly alpha-1,3-glucan or poly alpha-1,3-glucan derivative that can be used to practice the process include, but are not limited to, an aqueous basic solution containing components such as sodium hydroxide, potassium hydroxide, lithium hydroxide, lithium chloride/DMAC, DMSO/lithium chloride, etc. The solvent for the poly alpha-1,3-glucan should be miscible with the liquid used for the precipitation bath.

The mixing speed and the duration of mixing can be adjusted as desired.

The pH of the precipitation bath can be adjusted from acidic to neutral to basic depending upon the solvent chosen in which to mix the poly alpha-1,3-glucan or derivative.

It is believed that the precipitated calcium carbonate/polysaccharide composite obtained by the processes disclosed herein could be utilized as produced in slurry form, concentrated and dispersed at high solids for use in paper coating, or could be filtered, dried, and milled for use a dry product. It is expected that the precipitated calcium carbonate/polysaccharide composite obtained by the processes disclosed herein could be used in making paper. It is expected that the precipitated calcium carbonate/polysaccharide composite could be useful in making adhesives or paint, and could be used as filler in various polymers. For example, it is believed that the precipitated calcium carbonate/polysaccharide composite obtained as disclosed herein could be useful as a filler when blended with a polymer such as polyacrylates, polyaramids, polyphenylene isophthalamide, poly-m-phenylene isophthalamide, polyphenylene terephthalamide, vinyl polymers, polyethylene, polypropylene, poly(vinyl chloride), polystyrene, polytetrafluoroethylene, poly(alpha-methylstyrene), poly(acrylic acid), poly (isobutylene), poly(methacrylic acid), poly(methyl methacrylate), poly(1-pentene), poly(1,3-butadiene), poly (vinyl acetate), poly(2-vinyl pyridine), 1,4-polyisoprene, 3,4-polychloroprene, polyethers, poly(ethylene oxide), poly (propylene oxide), poly(trimethylene glycol), poly(tetramethylene glycol), polyacetals, polyformaldehyde, polyacetaldehyde, polyesters, poly(3-propionate), poly(10-decanoate), poly(ethylene terephthalate), poly(m-phenylene terephthalate); polyamides, polycaprolactam, poly(11-undecanoamide), poly(hexamethylene sebacamide), poly(tetramethylene-m-benzenesulfonamide), polyetheretherketone, polyetherimide, poly(phenylene oxide), polyamide (including polyureas), polyamideimide, polyarylate, polybenzimidazole, polycarbonates, polyurethane, polyimide, polyhydrazide, phenolic resins, polysilane, polysiloxane, polycarbodiimide, polyimine, azo polymers, polysulfide, polysulfane, cellulose polymers, or starch polymers. As used herein, "filler" means particles added to a polymer composition to lower the amount of more expensive material in the composition, and/or to improve the properties of the composition.

Non-limiting examples of the embodiments disclosed herein include:

1. A process for producing precipitated calcium carbonate, the process comprising the steps of:
   a) providing an aqueous slurry of calcium hydroxide;
   b) adding a polysaccharide to the slurry of calcium hydroxide; and
   c) carbonating the slurry of calcium hydroxide.
2. The process of embodiment 1, wherein step b) is performed before step c).
3. The process of embodiment 1, wherein step b) is performed concurrently with step c).
4. The process of embodiment 1, 2, or 3, wherein step b) is performed in a discontinuous manner.
5. The process of embodiment 1, 2, 3, or 4 wherein the polysaccharide is insoluble in the aqueous slurry of calcium hydroxide.
6. The process of embodiment 1, 2, 3, or 4 wherein at least a portion of the polysaccharide is soluble in the slurry of calcium hydroxide.
7. The process of embodiment 1, 2, 3, 4, 5, or 6, wherein the polysaccharide is added in an amount of from about 0.1 weight percent to about 40 weight percent, based on the total weight of precipitated calcium carbonate and polysaccharide composite obtained.
8. The process of embodiment 1, 2, 3, 4, 5, or 6, wherein the polysaccharide is added in an amount of from about 0.1 weight percent to about 80 weight percent, based on the total weight of precipitated calcium carbonate and polysaccharide composite obtained.
9. The process of embodiment 1, 2, 3, 4, 5, 6, 7, or 8 wherein the polysaccharide comprises an enzymatically-produced polysaccharide.
10. The process of embodiment 1, 2, 3, 4, 5, 6, 7, 8, or 9, wherein the polysaccharide comprises:
   i) poly alpha-1,3-glucan;
   ii) a composition comprising a poly alpha-1,3-glucan ester compound represented by Structure I:

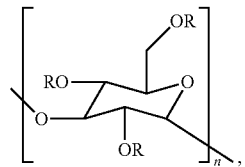

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3;

iii) a composition comprising a poly alpha-1,3-glucan ether compound represented by Structure II:

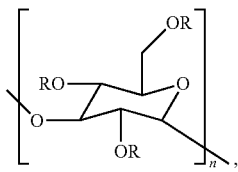

Structure II wherein
(D) n is at least 6,
(E) each R is independently an H or an organic group, and
(F) the ether compound has a degree of substitution (DOS) of about 0.001 to about 3; or
iv) a composition comprising a poly alpha-1,3-glucan ether compound represented by Structure III:

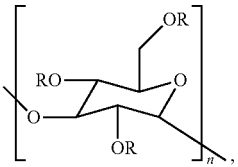

Structure III wherein
(G) n is at least 6,
(H) each R is independently an H or a positively charged organic group, and
(J) the compound has a degree of substitution of about 0.001 to about 3.0.

11. The process of embodiment 1, 2, 3, 4, 5, 6, 7, 8, 9, or 10, further comprising a step d) adding an additive to the slurry of calcium hydroxide.

12. The process of embodiment 11, wherein step d) is performed before step c), concurrently with step c), or after step c).

13. The process of embodiment 11 or 12, wherein the additive comprises polyphosphate, stearic acid, starch, cellulose, or alkyl ketene dimer.

14. The process of embodiment 1, 2, 3, 4, 5, 6, 7, 8, 9, 10, 11, 12, or 13, further comprising a step of using the precipitated calcium carbonate in a paper-making process.

15. Precipitated calcium carbonate produced according to a process of embodiment 1, 2, 3, 4, 5, 6, 7, 8, 9, 10, 11, 12, 13, or 14.

16. Paper comprising precipitated calcium carbonate produced according to a process of embodiment 1, 2, 3, 4, 5, 6, 7, 8, 9, 10, 11, 12, 13, or 14.

17. A polymer comprising precipitated calcium carbonate produced according to a process of embodiment 1, 2, 3, 4, 5, 6, 7, 8, 9, 10, 11, 12, or 13.

18. A process for producing a mixture comprising precipitated calcium carbonate and a polysaccharide, the process comprising the steps of:
a) providing an aqueous slurry of calcium hydroxide;
b) carbonating the slurry of calcium hydroxide to produce a slurry of precipitated calcium carbonate; and
c) adding a polysaccharide to the slurry of precipitated calcium carbonate.

19. The process of embodiment 18, wherein the polysaccharide is added in an amount of from about 0.1 weight percent to about 40 weight percent, based on the total weight of precipitated calcium carbonate and polysaccharide composite obtained.

20. The process of embodiment 18, wherein the polysaccharide is added in an amount of from about 0.1 weight percent to about 80 weight percent, based on the total weight of precipitated calcium carbonate and polysaccharide composite obtained.

21. The process of embodiment 18, 19, or 20, wherein the polysaccharide comprises an enzymatically-produced polysaccharide.

22. The process of embodiment 18, 19, 20, or 21, wherein the polysaccharide comprises:
i) poly alpha-1,3-glucan;
ii) a composition comprising a poly alpha-1,3-glucan ester compound represented by Structure I:

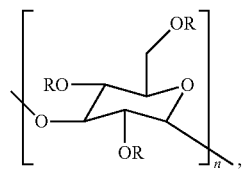

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3;
iii) a composition comprising a poly alpha-1,3-glucan ether compound represented by Structure II:

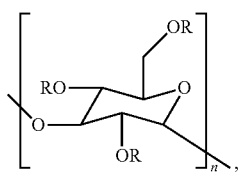

Structure II wherein
(D) n is at least 6,
(E) each R is independently an H or an organic group, and
(F) the ether compound has a degree of substitution (DOS) of about 0.001 to about 3; or
iv) a composition comprising a poly alpha-1,3-glucan ether compound represented by Structure III:

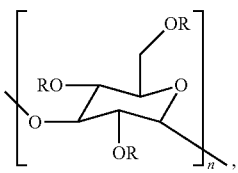

Structure III wherein
- (G) n is at least 6,
- (H) each R is independently an H or a positively charged organic group, and
- (J) the compound has a degree of substitution of about 0.001 to about 3.0.

23. The process of embodiment 18, 19, 20, 21, or 22, further comprising a step d) adding an additive to the slurry of calcium carbonate.

24. The process of embodiment 23, wherein the additive comprises polyphosphate, stearic acid, starch, cellulose, or alkyl ketene dimer.

25. The process of embodiment 18, 19, 20, 21, 22, 23, or 24, further comprising a step of using the mixture comprising precipitated calcium carbonate and a polysaccharide in a paper-making process.

26. A mixture comprising precipitated calcium carbonate and a polysaccharide, the mixture produced according to a process of embodiment 18, 19, 20, 21, 22, 23, 24, or 25.

27. Paper comprising a mixture comprising precipitated calcium carbonate and a polysaccharide, the mixture produced according to a process of embodiment 18, 19, 20, 21, 22, 23, 24, or 25.

28. A polymer comprising a mixture comprising precipitated calcium carbonate and a polysaccharide, the mixture produced according to a process of embodiment 18, 19, 20, 21, 22, 23 or 24.

EXAMPLES

As used herein, "Comp. Ex." Means Comparative Example; "Ex." means Example, "wt %" means weight percent. "PCC" means precipitated calcium carbonate. "PS" means polysaccharide. "Std dev" means standard deviation.

Materials

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Carboxymethyl poly alpha-1,3-glucan can be prepared as disclosed in Example 14 of U.S. Pat. No. 9,139,718 B2, which is incorporated herein in its entirety.

Trimethyl ammonium hydroxypropyl poly alpha-1,3-glucan can be prepared as disclosed in Example 1 of published patent application WO 2015/095358, which is incorporated herein in its entirety.

Poly Alpha-1,3-Glucan Succinate

Poly alpha-1,3-glucan succinate can be prepared according to the following procedure, using the amounts shown in Table 1 below. A jacketed reactor is loaded with water and 50% NaOH and the system is allowed to equilibrate to 60° C. Glucan wet cake is then added to the mixer followed by the succinic anhydride powder. The reaction is then kept at a constant temperature of 60° C. for 1 hour. Once the reaction is completed, the system is filtered and washed with deionized water. After the first filtration, the solid material is re-slurried with 3 kg of water and filtered again.

TABLE 1

| Materials for Synthesis of Poly Alpha-1,3-Glucan Succinate | |
|---|---|
| Glucan mass - dry (grams) | 1000.00 |
| Succinic anhydride (grams) | 37.06 |
| 50% NaOH in the system (grams) | 59.2 |
| Succinic anhydride (moles) | 0.37 |
| NaOH (moles) | 0.74 |
| Glucan wet cake mass (grams) | 2941.18 |
| Water added | 6034.11 |

Methods

Moisture content of the polysaccharides can be determined using an automatic moisture analyzer (Ohaus MB25 moisture analyzer) by weight difference.

The BET surface area of polysaccharides can be determined using the following procedure. Nitrogen adsorption/desorption measurements are performed at 77.3 K. on a Micromeritics ASAP model 2420 porosimeter. Samples are degassed at the above temperature for 12 h at <100 μm Hg prior to data collection. Surface area measurements utilize a five-point adsorption isotherm which is collected over 0.05 to 0.20 $P/P_0$ and is analyzed via the BET method [S. Brunauer, P. H. Emmett and E. Teller, *J. Amer. Chem. Soc.*, 60, 309(1938)]. Pore volume distributions utilize a multi-point desorption isotherm and are analyzed via the BJH method [E. P. Barrett, L. G. Joyner and P. P. Halenda, *J. Amer. Chem. Soc.*, 73, 373(1951).] P is the pressure of the gas above the sample (generally at liquid nitrogen BP temperature); Po is the saturation gas pressure at the temperature of the sample being measured (typically 760 Torr for nitrogen at 77.3 K).

Procedure 1—for Preparing Precipitated Calcium Carbonate

Precipitated calcium carbonate will be prepared according to the following method. In a reactor with a gas distribution system (inlet and outlet) and high speed agitator, a calcium hydroxide slurry will be prepared using active lime. It is expected that the calcium hydroxide slurry will be in the range of from about 10 weight percent to about 25 weight percent, based on the total weight of the slurry. A stream of carbon dioxide will be introduced into the reactor, and the temperature and pH of the slurry monitored. Carbon dioxide addition will be stopped when the pH of the slurry is about 7. The slurry produced using this procedure will be used to make paper samples.

Procedure 2—for Preparing Precipitated Calcium Carbonate with Polysaccharide

Examples of precipitated calcium carbonate and polysaccharide will be prepared following Procedure 1, except that a polysaccharide will be added to the calcium hydroxide slurry before the introduction of carbon dioxide. Polysaccharide will be added at a concentration in the range of from about 0.1 weight percent to about 40 weight percent, based on the calcium hydroxide concentration. The slurry produced using this procedure will be used to make paper samples.

Procedure 3—for Preparing a Mixture of Precipitated Calcium Carbonate and

Polysaccharide Precipitated calcium carbonate will be prepared using the following method. In a reactor with a gas distribution system (inlet and outlet) and high speed agitator, a calcium hydroxide slurry will be prepared using active lime. It is expected that the calcium hydroxide slurry will be in the range of from about 10 weight percent to about 25 weight percent, based on the total weight of the slurry. A stream of carbon dioxide will be introduced into the reactor, and the temperature and pH of the slurry monitored. Carbon dioxide addition will be stopped when the pH of the slurry is about 7.

After a slurry of precipitated calcium carbonate is prepared, polysaccharide will be added at a concentration in the range of from about 0.1 weight percent to about 40 weight percent, based on the calcium hydroxide concentration in the previous step. The slurry will be mixed well during the polysaccharide addition. The slurry produced using this procedure will be used to make paper samples.

Procedure for Preparing Handsheets of Paper

Handsheets will be made following TAPPI T205 standard, which is incorporated herein by reference. Bleached pulp will be combined with a slurry produced by Procedure 1, Procedure 2, or Procedure 3 as disclosed herein above. One example of a bleached pulp which could be used would be 85% *eucalyptus* and 15% spruce/pine, for example with a pulp freeness of about 25 SR. Other pulps with different mixtures of hardwood and softwood could also be used. Different relative amounts of the bleached pulp and slurry will be used to make the handsheets. The handsheets will be tested for such properties as tensile strength, opacity, retention, roughness parker print surf, air permeability, bendtsen, Scott bond, burst index, and tear index. TAPPI standards will be followed for all these measurements and are herein incorporated by reference.

Comparative Example A

Precipitated calcium carbonate will be prepared according to Procedure 1. No polysaccharide will be used.

Comparative Example B

The product of Comparative Example A will be used, in an amount "a", to make handsheets according to the Procedure for Preparing Handsheets of Paper. The properties of the paper will be evaluated using TAPPI standards.

Comparative Example C

The product of Comparative Example A will be used, in an amount "b", to make handsheets according to the Procedure for Preparing Handsheets of Paper. The properties of the paper will be evaluated using TAPPI standards.

Example 1A

Precipitated calcium carbonate will be prepared according to Procedure 2. Before the introduction of carbon dioxide, poly alpha-1,3-glucan will be added to the calcium hydroxide slurry, in an amount of 10 weight percent based on the weight of calcium hydroxide.

Example 1B

The product of Example 1A will be used, in an amount "x", to make handsheets according to the Procedure for Preparing Handsheets of Paper. The properties of the paper will be evaluated using TAPPI standards.

Example 1C

The product of Example 1A will be used, in an amount "y", to make handsheets according to the Procedure for Preparing Handsheets of Paper. The properties of the paper will be evaluated using TAPPI standards.

Example 2A

Precipitated calcium carbonate will be prepared according to Procedure 2. Before the introduction of carbon dioxide, carboxymethyl poly alpha-1,3-glucan will be added to the calcium hydroxide slurry, in an amount of 10 weight percent based on the weight of calcium hydroxide.

Example 2B

The product of Example 2A will be used, in an amount "x", to make handsheets according to the Procedure for Preparing Handsheets of Paper. The properties of the paper will be evaluated using TAPPI standards.

Example 2C

The product of Example 2A will be used, in an amount "y", to make handsheets according to the Procedure for Preparing Handsheets of Paper. The properties of the paper will be evaluated using TAPPI standards.

Example 3A

Precipitated calcium carbonate will be prepared according to Procedure 2. Before the introduction of carbon dioxide, trimethyl ammonium hydroxypropyl poly alpha-1,3-glucan will be added to the calcium hydroxide slurry, in an amount of 10 weight percent based on the weight of calcium hydroxide.

Example 3B

The product of Example 3A will be used, in an amount "x", to make handsheets according to the Procedure for Preparing Handsheets of Paper. The properties of the paper will be evaluated using TAPPI standards.

Example 3C

The product of Example 3A will be used, in an amount "y", to make handsheets according to the Procedure for Preparing Handsheets of Paper. The properties of the paper will be evaluated using TAPPI standards.

Example 4A

Precipitated calcium carbonate will be prepared according to Procedure 2. Before the introduction of carbon dioxide, poly alpha-1,3-glucan succinate will be added to the calcium hydroxide slurry, in an amount of 10 weight percent based on the weight of calcium hydroxide.

Example 4B

The product of Example 4A will be used, in an amount "x", to make handsheets according to the Procedure for Preparing Handsheets of Paper. The properties of the paper will be evaluated using TAPPI standards.

Example 4C

The product of Example 4A will be used, in an amount "y", to make handsheets according to the Procedure for Preparing Handsheets of Paper. The properties of the paper will be evaluated using TAPPI standards.

Example 5A

A mixture of precipitated calcium carbonate and polysaccharide will be prepared according to Procedure 3. After the slurry of precipitated calcium carbonate is prepared, poly alpha-1,3-glucan will be added to the calcium carbonate slurry, in an amount of 10 weight percent based on the weight of calcium hydroxide.

Example 5B

The product of Example 5A will be used, in an amount "x", to make handsheets according to the Procedure for Preparing Handsheets of Paper. The properties of the paper will be evaluated using TAPPI standards.

Example 5C

The product of Example 5A will be used, in an amount "y", to make handsheets according to the Procedure for Preparing Handsheets of Paper. The properties of the paper will be evaluated using TAPPI standards.

Example 6A

A mixture of precipitated calcium carbonate and polysaccharide will be prepared according to Procedure 3. After the slurry of precipitated calcium carbonate is prepared, carboxymethyl poly alpha-1,3-glucan will be added to the calcium carbonate slurry, in an amount of 10 weight percent based on the weight of calcium hydroxide.

Example 6B

The product of Example 6A will be used, in an amount "x", to make handsheets according to the Procedure for Preparing Handsheets of Paper. The properties of the paper will be evaluated using TAPPI standards.

Example 6C

The product of Example 6A will be used, in an amount "y", to make handsheets according to the Procedure for Preparing Handsheets of Paper. The properties of the paper will be evaluated using TAPPI standards.

Example 7A

A mixture of precipitated calcium carbonate and polysaccharide will be prepared according to Procedure 3. After the slurry of precipitated calcium carbonate is prepared, trimethyl ammonium hydroxypropyl poly alpha-1,3-glucan will be added to the calcium carbonate slurry, in an amount of 10 weight percent based on the weight of calcium hydroxide.

Example 7B

The product of Example 7A will be used, in an amount "x", to make handsheets according to the Procedure for Preparing Handsheets of Paper. The properties of the paper will be evaluated using TAPPI standards.

Example 7C

The product of Example 7A will be used, in an amount "y", to make handsheets according to the Procedure for Preparing Handsheets of Paper. The properties of the paper will be evaluated using TAPPI standards.

Example 8A

A mixture of precipitated calcium carbonate and polysaccharide will be prepared according to Procedure 3. After the slurry of precipitated calcium carbonate is prepared, poly alpha-1,3-glucan succinate will be added to the calcium carbonate slurry, in an amount of 10 weight percent based on the weight of calcium hydroxide.

Example 8B

The product of Example 8A will be used, in an amount "x", to make handsheets according to the Procedure for Preparing Handsheets of Paper. The properties of the paper will be evaluated using TAPPI standards.

Example 8C

The product of Example 8A will be used, in an amount "y", to make handsheets according to the Procedure for Preparing Handsheets of Paper. The properties of the paper will be evaluated using TAPPI standards.

Examples 9-18

Precipitated Calcium Carbonate/Polysaccharide Composites

For Examples 9 through 18, samples of precipitated calcium carbonate/polysaccharide composites were prepared as described herein below, using the amounts of polysaccharide and calcium hydroxide shown below in Table 1. The column labelled "Wt % CaCO$_3$" indicates the target concentration of calcium carbonate in the final slurry. For Comparative Example D, no polysaccharide was used. Poly alpha-1,3-glucan was prepared as described herein above. Carboxymethyl poly alpha-1,3-glucan, trimethyl ammonium hydroxypropyl poly alpha-1,3-glucan (referred to as "cationic glucan" in Table 1), and poly alpha-1,3-glucan succinate were prepared similarly to the methods provided herein above. The carboxymethyl poly alpha-1,3-glucan had a DoS of 0.28. The trimethyl ammonium hydroxypropyl poly alpha-1,3-glucan and the poly alpha-1,3-glucan succinate each had a DoS of less than about 0.01. Both poly alpha-1,3-glucan and cationic glucan were used in wet cake form and in fibroid form to prepare precipitated calcium carbonate/polysaccharide composites. Fibrids can be prepared as disclosed in published patent application WO 2016/196022.

The carboxymethyl poly alpha-1,3-glucan sample is believed to be soluble under the reaction conditions used to form the precipitated calcium carbonate/polysaccharide composite. The other polysaccharides are insoluble under the reaction conditions used to form the composites.

To prepare the precipitated calcium carbonate/polysaccharide composites, the polysaccharide (oven dried) was mixed with lime milk and water to a stock consistency of no greater than 8%. The stock was dispersed for 10 minutes at 1500 rpm. Carbon dioxide was pumped through the stock at a rate of 8 liters/minute while maintaining the stirring rate at 950 rpm until 100% conversion of the lime to calcium carbonate was obtained, as determined by the pH of the reaction mixture dropping to 7. The solids were isolated by filtration.

TABLE 1

Conditions Used to Prepare Samples of Precipitated Calcium Carbonate/Polysaccharide Composites in Examples 9 through 18 and Comparative Example D

| Example No. | Polysaccharide (PS) | Amount of PS* (g) | Wt % CaCO$_3$** | Ca(OH)$_2$ (moles) | Ca(OH)$_2$ (moles/L) | D50 (μm) |
|---|---|---|---|---|---|---|
| Comp. Ex. D | None | 0 | 100 | | | NA |
| 9 | Poly alpha-1,3-glucan as wet cake | 100 | 20 | 0.25 | 0.04 | 16.88 |
| 10 | Poly alpha-1,3-glucan as wet cake | 100 | 60 | 1.50 | 0.25 | 7.99 |
| 11 | Cationic glucan as fibrids | 100 | 20 | 0.25 | 0.04 | 59.53 |
| 12 | Cationic glucan as fibrids | 100 | 80 | 3.99 | 0.67 | 51.88 |
| 13 | Cationic glucan as wet cake | 100 | 20 | 0.25 | 0.04 | NA |
| 14 | Cationic Glucan as wet cake | 100 | 80 | 3.99 | 0.67 | NA |
| 15 | Poly alpha-1,3-glucan succinate | 115.78 | 70 | 2.70 | 0.45 | 8.73 |
| 16 | Carboxymethyl poly alpha-1,3-glucan | 115.78 | 70 | 2.70 | 0.45 | 4.61 |
| 17 | Poly alpha-1,3-glucan as fibrids | 100 | 40 | 0.67 | 0.11 | NA |
| 18 | Poly alpha-1,3-glucan as fibrids | 100 | 60 | 1.5 | 0.25 | NA |

Notes:
NA means not available
*Amount of polysaccharide (PS) given on a dry basis
**"Wt % CaCO$_3$" refers to the theoretical amount of CaCO$_3$ in the precipitated calcium carbonate/polysaccharide composite obtained The particle size distribution was measured using the Mastersizer microplus from Malvern Instruments. It is a laser diffraction method in which the scattered light pattern in consideration of the refractive index of the respective sample serves as a calculation basis for the particle size distribution. The diluted sample is continuously pumped through the system so that sedimentation effects can be excluded during the measurement. After recording the blank value, for the measurement a small part of the well mixed sample was added to distilled water and measured in high dilution (conc. 0.01-0.1%). The sample was then treated with ultrasound for one/two minutes and measured again. In each case two measurements were carried out (double determination). D50 values of the isolated solids (precipitated calcium carbonate/polysaccharide composites) are reported in Table 1.

For analysis by scanning electron microscopy, the samples were dispersed in distilled water and applied to an object carrier (brass plate) by pipette. This brass plate was heated on a heating plate so that the water evaporated and only the sample remained on the carrier. In the next step, the sample was coated in the sputter coater with a conductive layer. Thereafter, the sample could be analyzed in a scanning electron microscope.

Figure 2:
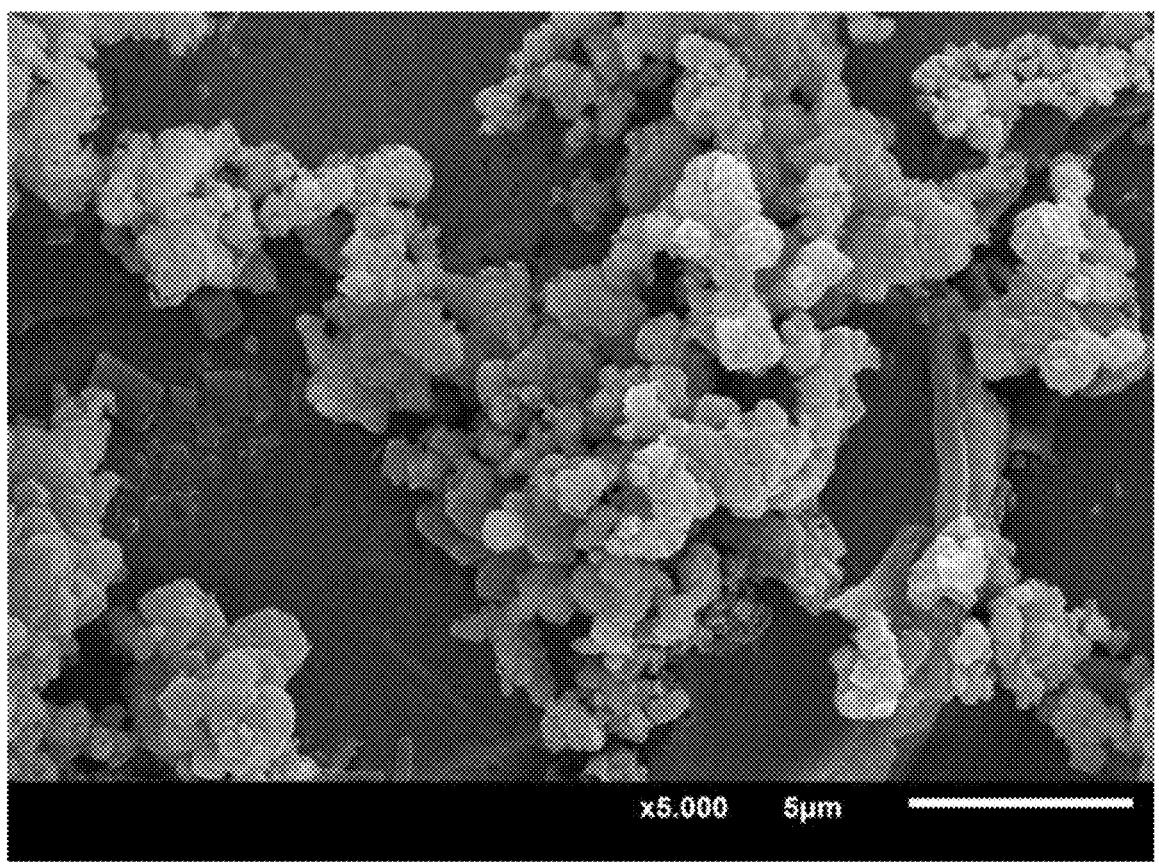
FIG. 2 is a reproduction of a scanning electron microscopy image of the precipitated product obtained in Example 9.
Figure 3:
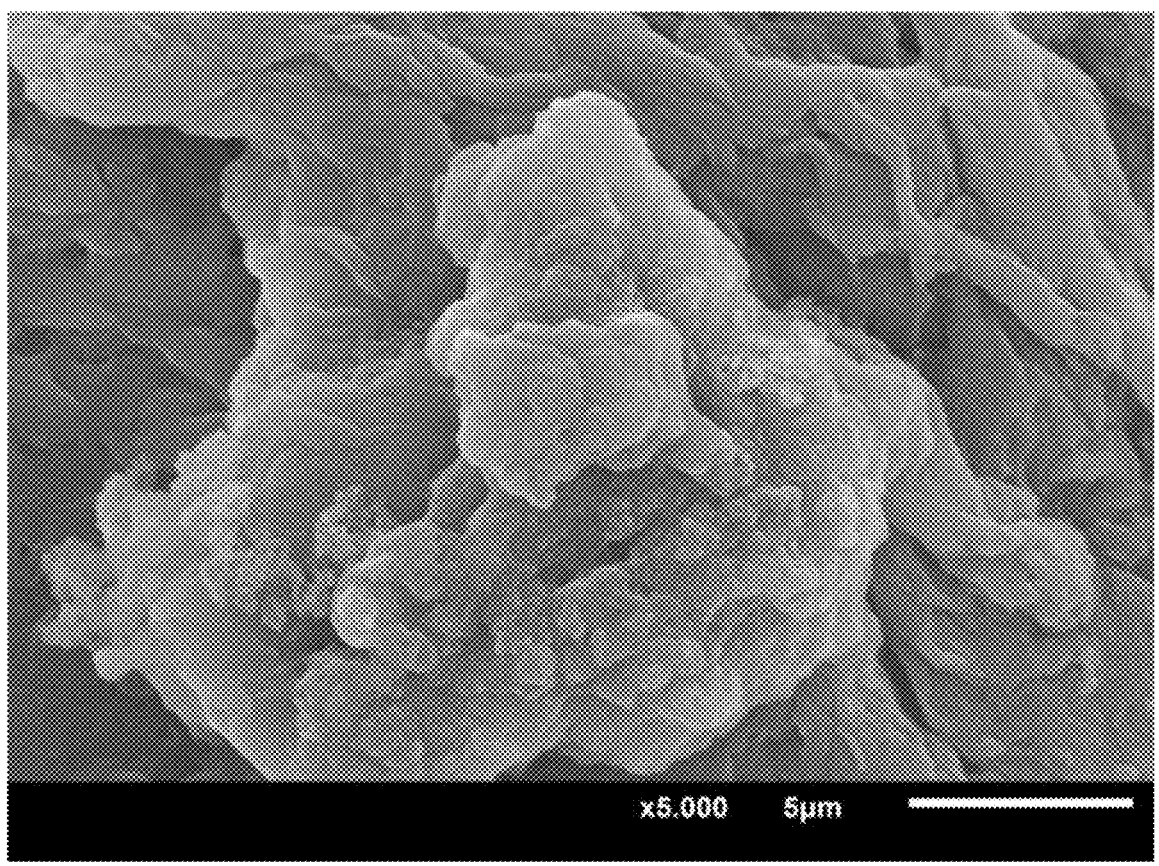
FIG. 3 is a reproduction of a scanning electron microscopy image of the precipitated product obtained in Example 10.
Figure 4:
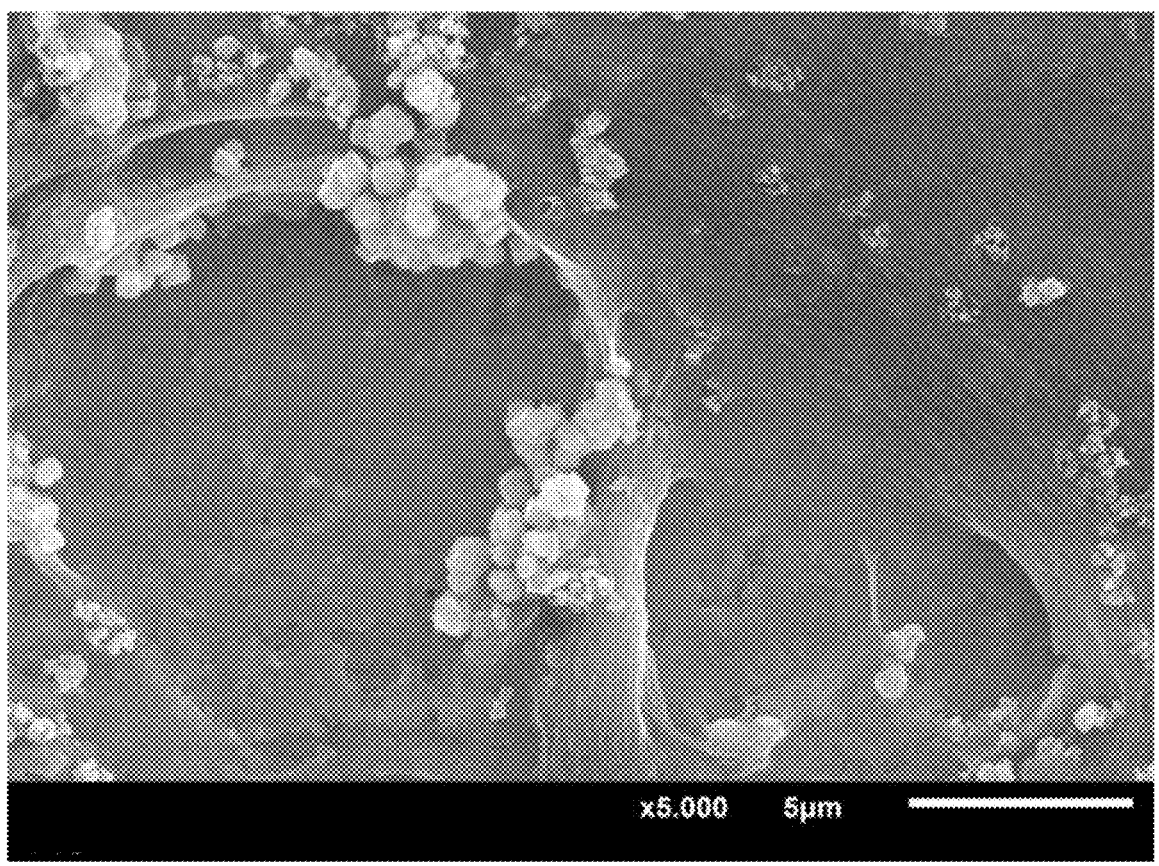
FIG. 4 is a reproduction of a scanning electron microscopy image of the precipitated product obtained in Example 11.
Figure 5:
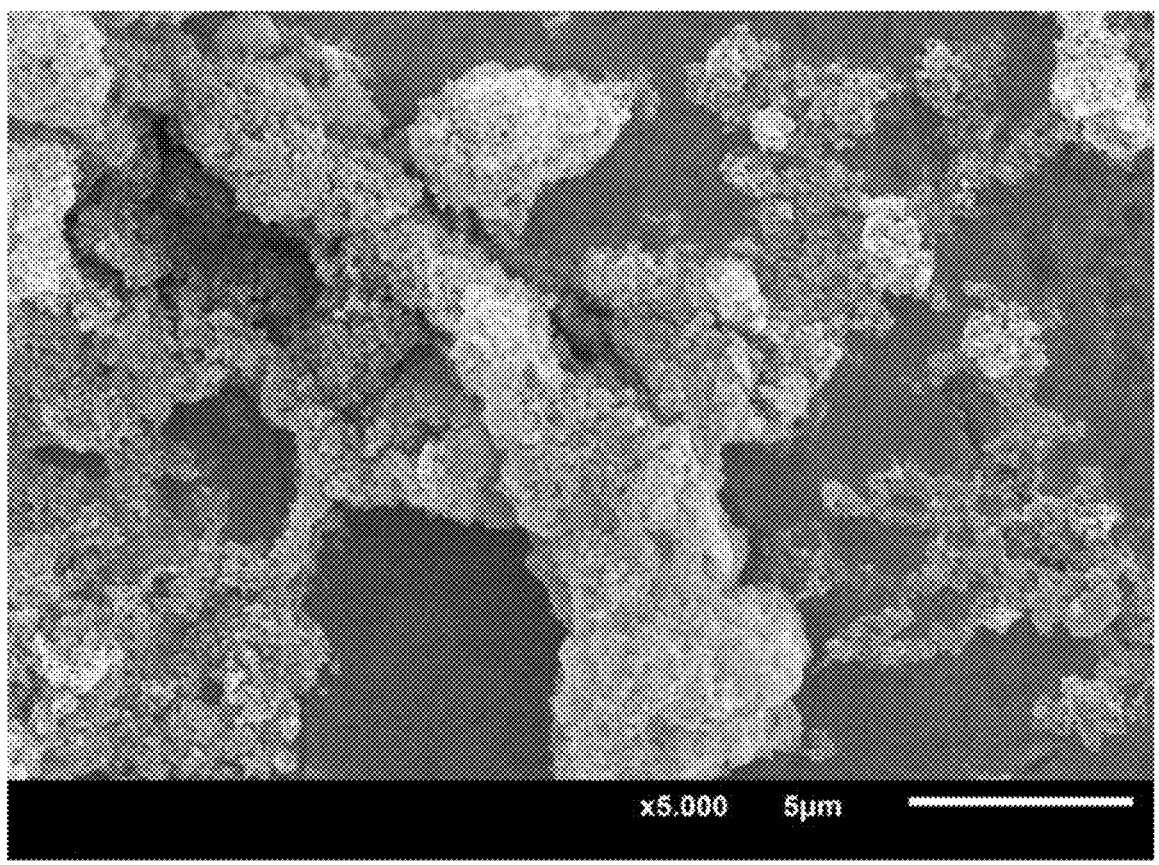
FIG. 5 is a reproduction of a scanning electron microscopy image of the precipitated product obtained in Example 12.
Figure 6:
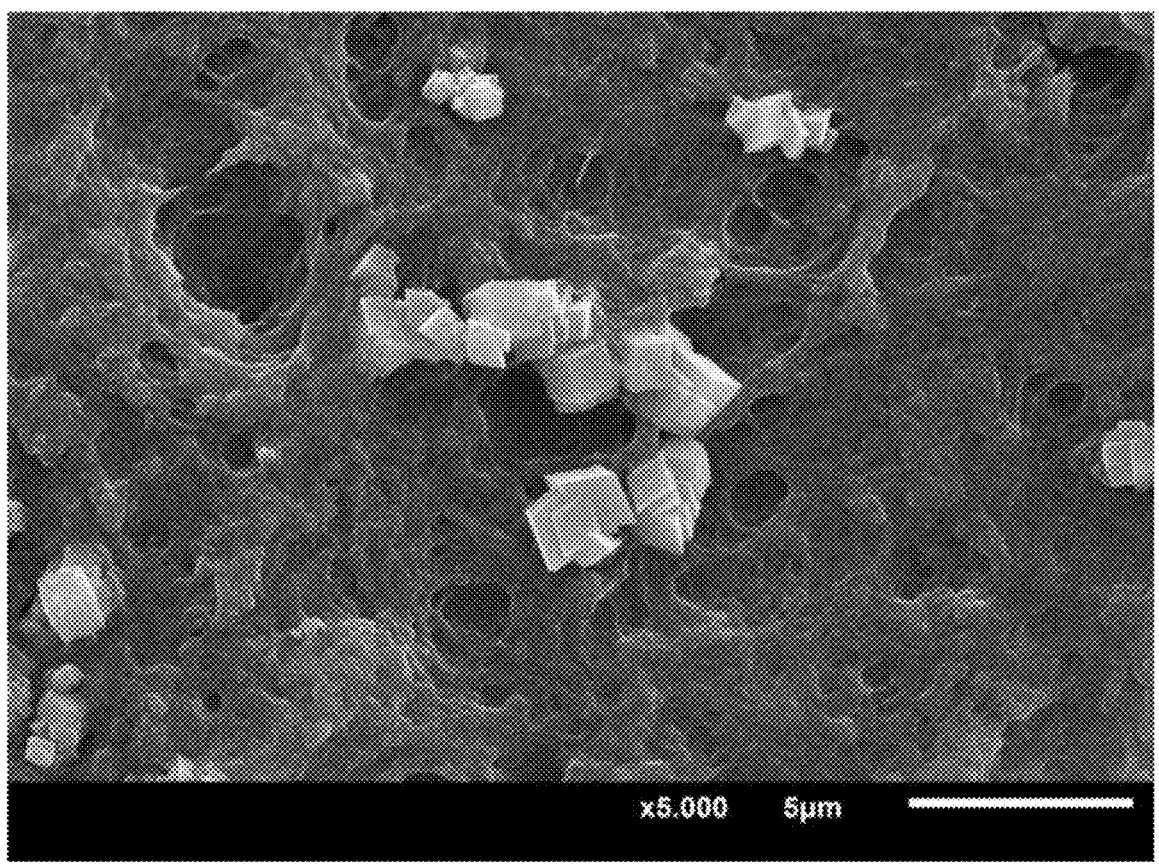
FIG. 6 is a reproduction of a scanning electron microscopy image of the precipitated product obtained in Example 13.
Figure 7:
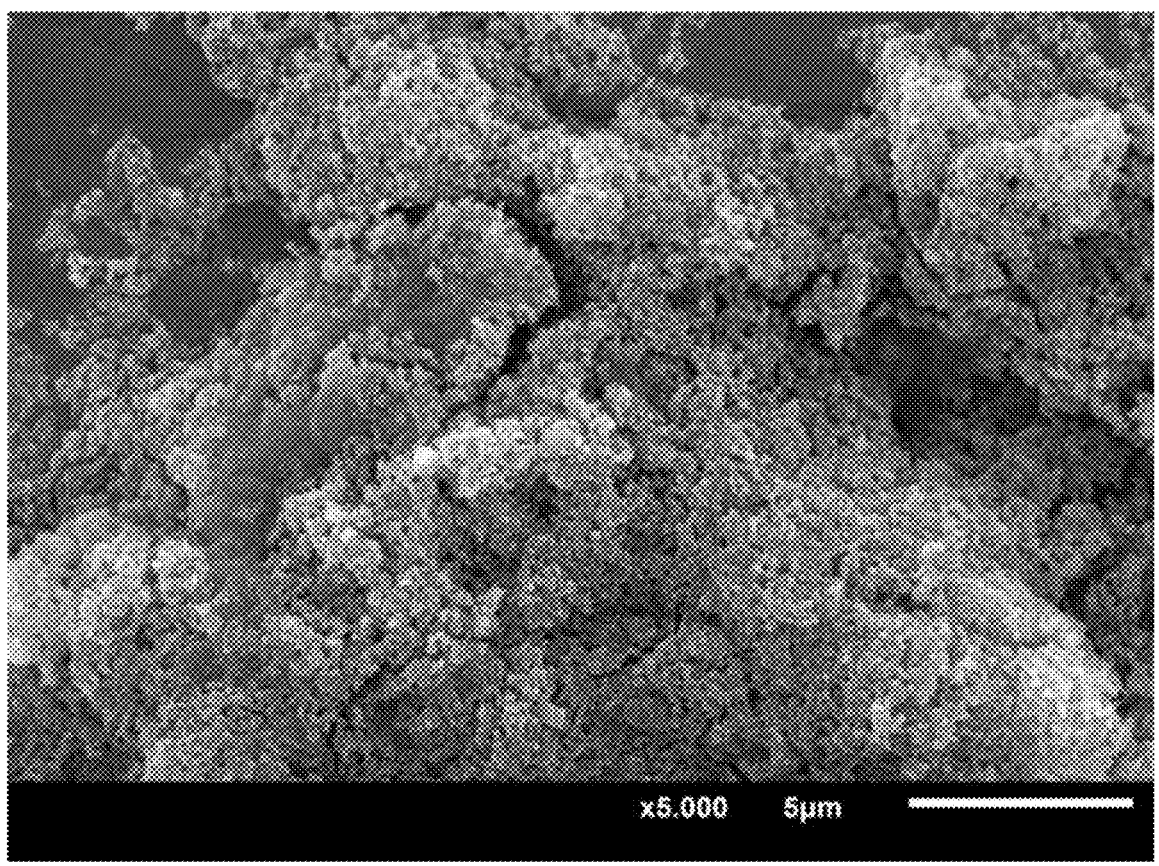
FIG. 7 is a reproduction of a scanning electron microscopy image of the precipitated product obtained in Example 14.
Figure 8:
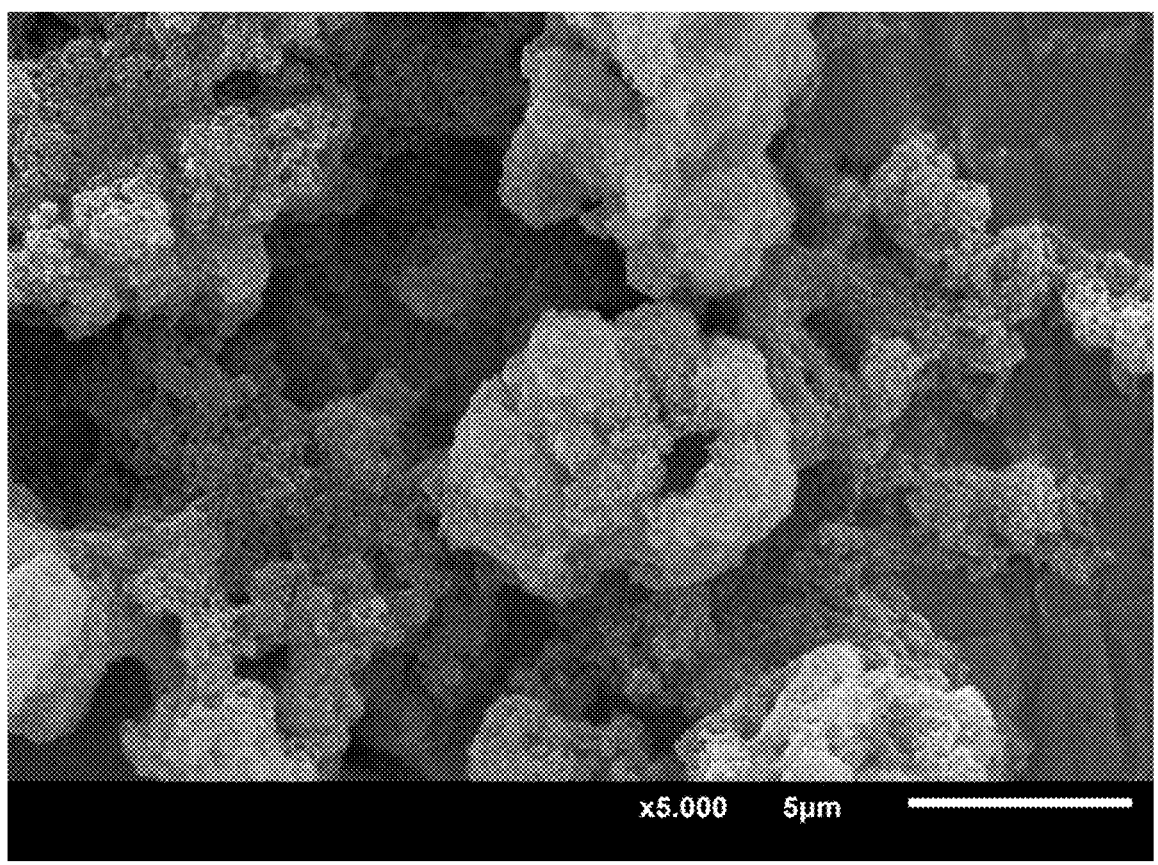
FIG. 8 is a reproduction of a scanning electron microscopy image of the precipitated product obtained in Example 15.
Figure 9:
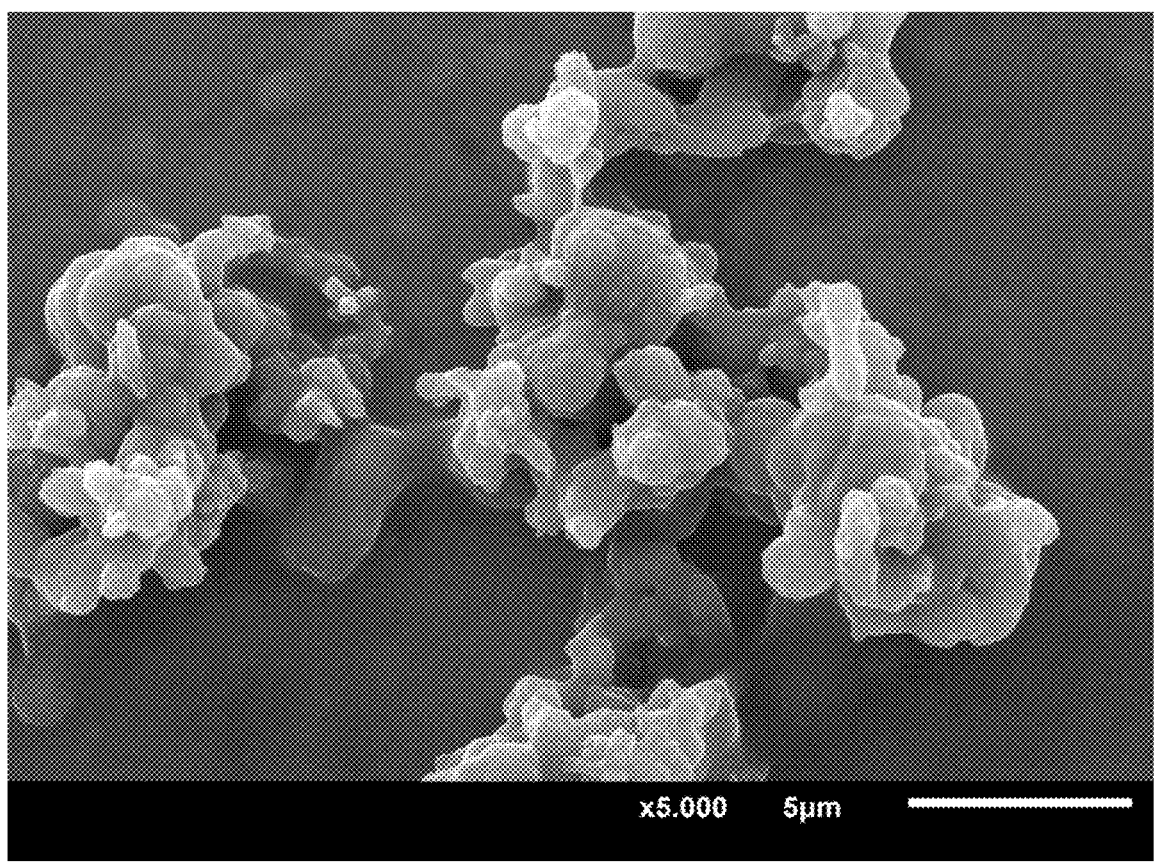
FIG. 9 is a reproduction of a scanning electron microscopy image of the precipitated product obtained in Example 16.

Images obtained by scanning electron microscopy are shown in FIGS. 1 through 9. In general, it can be seen through these images that the poly alpha-1,3-glucan and its derivatives alter crystallization of the calcium carbonate in forming the precipitated calcium carbonate/polysaccharide composite.

Examples 19-28

Handsheets Containing Precipitated Calcium Carbonate/Polysaccharide Composites

Handsheets of paper were made using precipitated calcium carbonate/polysaccharide composites prepared as described herein above. Handsheet formation was done according to ISO 5269-2:2004-11. The fiber used was 85% *eucalyptus* kraft pulp (Euca HKP) and 15% Northern bleached softwood kraft pulp, Schopper Riegler freeness (SR)=42.

The handsheets contained either 5 wt % or 10 wt % polysaccharide. The handsheets containing 5% polysaccharide further contained 70% fiber and 25% calcium carbonate. Commercial PCC (obtained from Omya International) was added to the calcium carbonate contained in the precipitated calcium carbonate/polysaccharide composite to bring the total calcium carbonate content in the handsheet to the designated 25% level. The handsheets containing 10% polysaccharide further contained 65% fiber and 25% calcium carbonate, with commercial PCC added to bring the total calcium carbonate content in the handsheet to the designated 25% level. Table 2 below lists the material used in making handsheets.

TABLE 2

Material Used to Make Handsheets

| Handsheet Example No. | Wt % Polysaccharide in Handsheet | PCC/Polysaccharide Composite |
|---|---|---|
| Comp. Ex. E | 0 | None |
| 19 | 5 | From Ex. 9 |
| 20 | 10 | From Ex. 9 |
| 21 | 5 | From Ex. 10 |
| 22 | 10 | From Ex. 10 |
| 23 | 5 | From Ex. 17 |
| 24 | 10 | From Ex. 17 |
| 25 | 5 | From Ex. 18 |
| 26 | 10 | From Ex. 18 |
| 27 | 5 | From Ex. 12 |
| 28 | 10 | From Ex. 12 |

Handsheet analysis results are presented in Table 3 below. Tensile index (tensile strength) was determined according to ISO 1924-2. Opacity was determined according to ISO 2471. Bending Stiffness was determined according to DIN 53121. CIE Whiteness was determined according to ISO 11475. Scott Bond was determined according to TAPPI T569.

Also analyzed was a handsheet (Comparative Example F) formed similarly to that of Comparative Example E but using only commercially obtained precipitated calcium carbonate and with no polysaccharide added. Results for Comparative Example F were as follows:

Tensile Index: Average 23.07 Nm/g (std dev 0.78 Nm/g)
Bending Stiffness: Average 24.57 mN (std dev 15.0 mN)
Scott Bond: Average 136.0 J/m² (std dev 5.7 J/m²)
CIE Whiteness: Average 86.40% (std dev 0.08%)
Opacity: Average 90.86% (std dev 0.37%)

TABLE 3

Analysis of Handsheets

| Example No. | Tensile Index Average (Nm/g) | Tensile Index Standard deviation (Nm/g) | Bending Stiffness Average (mN) | Bending Stiffness Standard deviation (mN) | Scott Bond Average (J/m²) | Scott Bond Standard deviation (J/m²) | CIE Whiteness Average (%) | CIE Whiteness Standard deviation (%) | Opacity Average (%) | Opacity Standard deviation (%) |
|---|---|---|---|---|---|---|---|---|---|---|
| Comp. Ex. E | 13.22 | 0.55 | 10.0 | 1.2 | 43.0 | 8.2 | 77.42 | 0.11 | 85.53 | 0.15 |
| 19 | 19.994 | 0.928 | 14 | 0.4 | 137 | 8 | 85.88 | 0.09 | 90.97 | 0.13 |
| 20 | 16.956 | 0.62 | 13 | 1.5 | 114 | 5.3 | 85.74 | 0.16 | 90.56 | 0.2 |
| 21 | 18.431 | 0.283 | 13 | 1.5 | 114 | 7 | 84.75 | 0.27 | 90.03 | 1.2 |
| 22 | 15.884 | 0.253 | 10 | 0.1 | 97 | 3.5 | 84.95 | 0.11 | 89.63 | 0.2 |
| 23 | 27.134 | 0.968 | 14 | 1 | 214 | 5.4 | 77.69 | 0.54 | 92.62 | 0.23 |
| 24 | 32.157 | 1.227 | 14 | 3 | 373 | 33.4 | 71.68 | 0.66 | 92.92 | 0.37 |
| 25 | 26.272 | 0.816 | 14 | 0.1 | 187 | 4.6 | 76.82 | 0.27 | 90.56 | 0.21 |
| 26 | 25.954 | 1.221 | 12 | 1.9 | 217 | 18 | 70.79 | 0.71 | 91.31 | 0.13 |
| 27 | 23.246 | 0.817 | 11 | 1.5 | 136 | 8.5 | 75.06 | 0.28 | 89.53 | 0.16 |
| 28 | 22.763 | 0.738 | 7 | 1.2 | 141 | 8.5 | 70.72 | 0.76 | 85.72 | 0.26 |

What is claimed is:

1. A process for producing precipitated calcium carbonate, the process comprising steps of:

(a) providing an aqueous slurry of calcium hydroxide, (b) adding a polysaccharide to the slurry of calcium hydroxide, and (c) carbonating the slurry of calcium hydroxide;

wherein the polysaccharide comprises:

(i) poly alpha-1,3-glucan;

(ii) a poly alpha-1,3-glucan ester compound represented by Structure I:

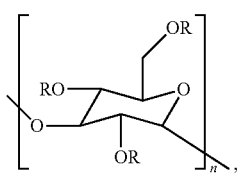

wherein (A) n is at least 6, (B) each R is independently an —H or first group comprising —CO—$C_x$—COON, wherein the —$C_x$— portion of said first group comprises a chain of 2 to 18 carbon atoms, and (C) the compound has a degree of substitution with the first group of about 0.001 to about 3.0;

(iii) a poly alpha-1,3-glucan ether compound represented by Structure II:

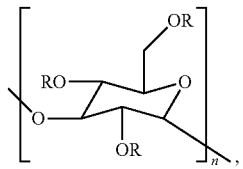

wherein (A) n is at least 6, (B) each R is independently an H or organic group, and (C) the ether compound has a degree of substitution with the organic group of about 0.001 to about 3.0;

or (iv) a poly alpha-1,3-glucan ether compound represented by Structure III:

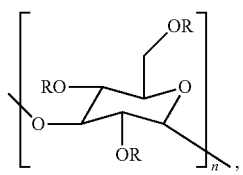

wherein (A) n is at least 6, (B) each R is independently an H or positively charged organic group, and (C) the ether compound has a degree of substitution with the positively charged organic group of about 0.001 to about 3.0.

2. The process of claim 1, wherein step (b) is performed before step (c), or concurrently with step (c).

3. The process of claim 1, wherein step (b) is performed in a discontinuous manner.

4. The process of claim 1, wherein the polysaccharide is insoluble in the aqueous slurry of calcium hydroxide.

5. The process of claim 1, wherein at least a portion of the polysaccharide is soluble in the slurry of calcium hydroxide.

6. The process of claim 1, wherein the polysaccharide is added in an amount of about 0.1 weight percent to about 80 weight percent, based on the total weight of precipitated calcium carbonate and polysaccharide.

7. The process of claim 1, wherein the polysaccharide comprises said poly alpha-1,3-glucan.

8. The process of claim 7, wherein at least 90% of the glycosidic linkages of the poly alpha-1,3-glucan are alpha-1,3 glycosidic linkages.

9. The process of claim 1, wherein step (b) further comprises adding an additive to the slurry of calcium hydroxide.

10. The process of claim 9, wherein the additive comprises polyphosphate, stearic acid, starch, cellulose, or alkyl ketene dimer.

11. A mixture produced according to the process of claim 1, wherein the mixture comprises precipitated calcium carbonate and the polysaccharide.

12. Paper comprising the mixture of claim 11.

13. The paper of claim 12, wherein the polysaccharide is said poly alpha-1,3-glucan.

14. A process for producing a mixture comprising precipitated calcium carbonate and a polysaccharide, the process comprising steps of:

(a) providing an aqueous slurry of calcium hydroxide, (b) carbonating the slurry of calcium hydroxide to produce a slurry of precipitated calcium carbonate, and (c) adding a polysaccharide to the slurry of precipitated calcium carbonate; wherein the polysaccharide comprises:

(i) poly alpha-1,3-glucan;

(ii) a poly alpha-1,3-glucan ester compound represented by Structure I:

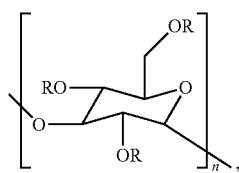

wherein (A) n is at least 6, (B) each R is independently an —H or first group comprising —CO—$C_X$—COON, wherein the —$C_x$— portion of said first group comprises a chain of 2 to 18 carbon atoms, and (C) the compound has a degree of substitution with the first group of about 0.001 to about 3.0;

(iii) a poly alpha-1,3-glucan ether compound represented by Structure II:

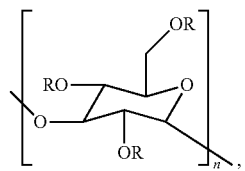

wherein (A) n is at least 6, (B) each R is independently an H or organic group, and (C) the ether compound has a degree of substitution with the organic group of about 0.001 to about 3.0;

or (iv) a poly alpha-1,3-glucan ether compound represented by Structure III:

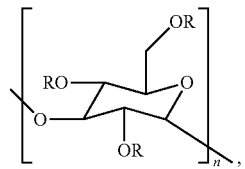

wherein (A) n is at least 6, (B) each R is independently an H or positively charged organic group, and (C) the ether compound has a degree of substitution with the positively charged organic group of about 0.001 to about 3.0.

15. The process of claim 14, wherein the polysaccharide is added in an amount of about 0.1 weight percent to about 80 weight percent, based on the total weight of precipitated calcium carbonate and polysaccharide.

16. The process of claim 14, wherein the polysaccharide comprises said poly alpha-1,3-glucan.

17. The process of claim 16, wherein at least 90% of the glycosidic linkages of the poly alpha-1,3-glucan are alpha-1,3 glycosidic linkages.

18. The process of claim 14, wherein step (c) further comprises adding an additive to the slurry of precipitated calcium carbonate.

19. The process of claim 18, wherein the additive comprises polyphosphate, stearic acid, starch, cellulose, or alkyl ketene dimer.

20. A mixture produced according to the process of claim 14, wherein the mixture comprises the precipitated calcium carbonate and the polysaccharide.

21. Paper comprising the mixture produced according to the process of claim 20.

22. The paper of claim 21, wherein the polysaccharide is said poly alpha-1,3-glucan.

* * * * *